United States Patent
Princen et al.

(10) Patent No.: US 11,814,152 B2
(45) Date of Patent: Nov. 14, 2023

(54) METHODS AND APPARATUS FOR ACCELERATING AN AIRCRAFT FUSELAGE BOUNDARY LAYER VIA A FAN POWERED BY AN AUXILIARY POWER UNIT OF THE AIRCRAFT

(71) Applicant: The Boeing Company, Chicago, IL (US)

(72) Inventors: Norman H. Princen, Long Beach, CA (US); Robert H. Liebeck, Irvine, CA (US); Sho Sato, Mercer Island, WA (US)

(73) Assignee: The Boeing Company, Arlington, VA (US)

(*) Notice: Subject to any disclaimer, the term of this patent is extended or adjusted under 35 U.S.C. 154(b) by 284 days.

(21) Appl. No.: 17/241,913

(22) Filed: Apr. 27, 2021

(65) Prior Publication Data

US 2022/0017207 A1 Jan. 20, 2022

Related U.S. Application Data

(60) Provisional application No. 63/054,051, filed on Jul. 20, 2020.

(51) Int. Cl.
*B64C 11/00* (2006.01)
*B64C 21/08* (2023.01)
(Continued)

(52) U.S. Cl.
CPC ............ *B64C 11/001* (2013.01); *B64C 21/08* (2013.01); *B64D 27/24* (2013.01);
(Continued)

(58) Field of Classification Search
CPC ... B64C 11/001; B64C 21/08; B64C 2230/04; B64C 2230/06; B64D 27/24; B64D 2041/002
(Continued)

(56) References Cited

U.S. PATENT DOCUMENTS 7,134,271 B2 11/2006 Baughman et al.
8,667,775 B1 3/2014 Kisska et al.
(Continued)

OTHER PUBLICATIONS

Perry et al., "Aero-Propulsive and Propulsor Cross-Coupling Effects on a Distributed Propulsion System," Journal of Aircraft, vol. 55, No. 6, Nov.-Dec. 2018, 13 pages.
(Continued)

*Primary Examiner* — Brady W Frazier
(74) *Attorney, Agent, or Firm* — HANLEY, FLIGHT & ZIMMERMAN

(57) ABSTRACT

Methods and apparatus for accelerating an aircraft fuselage boundary layer via a fan powered by an APU of the aircraft are disclosed. An example aircraft includes a fuselage, an APU, and a fan. The fuselage includes an outer skin. The APU is located within the fuselage. The fan includes a plurality of fan blades arranged circumferentially about the APU and projecting radially outward from the outer skin. The fan further includes a fan drive operatively coupled to the APU. The fan drive is configured to rotate the fan blades in response to a supply of electrical energy provided to the fan drive from the APU. The rotation of the fan blades accelerates a fuselage boundary layer traveling rearward along the outer skin from a first velocity to a second velocity greater than the first velocity.

20 Claims, 12 Drawing Sheets

(51) Int. Cl.
*B64D 27/24* (2006.01)
*B64D 41/00* (2006.01)

(52) U.S. Cl.
CPC ...... *B64C 2230/04* (2013.01); *B64C 2230/06* (2013.01); *B64D 2041/002* (2013.01)

(58) Field of Classification Search
USPC ...................................................... 244/53 R
See application file for complete search history.

(56) References Cited

U.S. PATENT DOCUMENTS

| | | | |
|---|---|---|---|
| 10,538,335 B2 * | 1/2020 | Conti | B64D 27/14 |
| 2015/0300254 A1 * | 10/2015 | Stretton | F02C 7/18 |
| | | | 137/15.1 |
| 2018/0354637 A1 * | 12/2018 | Suciu | F02C 7/18 |
| 2019/0031363 A1 * | 1/2019 | Hoisington | B64D 35/00 |
| 2021/0107676 A1 * | 4/2021 | Sibbach | B64C 21/06 |
| 2021/0291964 A1 * | 9/2021 | Gilbert | B64D 41/007 |

OTHER PUBLICATIONS

Pieper et al., "Design and Development of a Dynamically, Scaled Distributed Electric Propulsion Aircraft Testbed," AIAA Propulsion and Energy Forum, Jul. 9-11, 2018, 23 pages.
Centreline Project ID: 723242, "Concept Validation Study for Fuselage Wake-Filling Propulsion Integration," from Jun. 1, 2017 to May 31, 2020, 9 pages.
Centreline, "Specification of Propulsive Fuselage Aircraft Layout and Design Features," dated Apr. 24, 2018, 34 pages.

* cited by examiner

METHODS AND APPARATUS FOR ACCELERATING AN AIRCRAFT FUSELAGE BOUNDARY LAYER VIA A FAN POWERED BY AN AUXILIARY POWER UNIT OF THE AIRCRAFT

RELATED APPLICATIONS

This application claims priority to U.S. Provisional Patent Application No. 63/054,051, filed Jul. 20, 2020, entitled "Methods And Apparatus For Accelerating An Aircraft Fuselage Boundary Layer Via A Fan Powered By An Auxiliary Power Unit Of The Aircraft." The entirety of U.S. Provisional Patent Application No. 63/054,051 is hereby incorporated by reference herein.

FIELD OF THE DISCLOSURE

This disclosure relates generally to methods and apparatus for accelerating an aircraft fuselage boundary layer and, more particularly, to methods and apparatus for accelerating an aircraft fuselage boundary layer via a fan powered by an auxiliary power unit (APU) of the aircraft.

BACKGROUND

Air traveling over the fuselage of an aircraft creates a boundary layer along the fuselage (e.g., along an aft and/or rear portion of the fuselage) where the velocity of the air reduces below the free stream velocity. The velocity deficit of the boundary layer relative to the free stream generates a drag force on the fuselage and/or, more generally, on the aircraft. At present, drag resulting from the aforementioned fuselage boundary layer is accepted as part of the overall drag associated with operating the aircraft. However, as drag increases the amount of fuel consumed when operating the aircraft, there is a persistent interest in the aircraft industry with regard to developing and implementing technologies designed to reduce drag, including reducing drag attributed to the existence of the fuselage boundary layer.

Boundary layer ingestion (BLI) is an area of aerodynamic research which focuses on reducing drag via a propeller configured to ingest the fuselage boundary layer, and to accelerate the associated airflow of the ingested fuselage boundary layer to a velocity that equals or exceeds the free stream velocity. Numerous BLI implementations and/or proposals are known. A common characteristic among such known BLI solutions is the requirement that one or more large, heavy, thrust-producing engine(s) be installed at the rear of the fuselage (e.g., proximate a tail of the aircraft), with the propeller of each such engine being configured to ingest the fuselage boundary layer and accelerate the associated airflow of the ingested fuselage boundary layer to a velocity that equals or exceeds the free stream velocity. Such known BLI solutions are typically not retrofittable to existing aircraft designs absent significant structural modifications to the aircraft.

SUMMARY

Methods and apparatus for accelerating an aircraft fuselage boundary layer via a fan powered by an APU of the aircraft are disclosed. In some examples, an aircraft is disclosed. In some disclosed examples, the aircraft comprises a fuselage, an APU, and a fan. The fuselage includes an outer skin. The APU is located within the fuselage. The fan includes a plurality of fan blades arranged circumferentially about the APU and projecting radially outward from the outer skin. The fan further includes a fan drive operatively coupled to the APU. The fan drive is configured to rotate the fan blades in response to a supply of electrical energy provided to the fan drive from the APU. The rotation of the fan blades is to accelerate a fuselage boundary layer traveling rearward along the outer skin from a first velocity to a second velocity greater than the first velocity.

In some examples, a method is disclosed. In some disclosed examples, the method comprises providing a supply of electrical energy from an APU of an aircraft to a fan drive of a fan of the aircraft. The fan drive is operatively coupled to the APU. The fan includes a plurality of fan blades arranged circumferentially about the APU and projecting radially outward from an outer skin of a fuselage of the aircraft. The APU is located within the fuselage. In some disclosed examples, the method further comprises rotating the fan blades via the fan drive in response to the supply of electrical energy provided to the fan drive. The rotation of the fan blades accelerates a fuselage boundary layer traveling rearward along the outer skin from a first velocity to a second velocity greater than the first velocity.

Figure 1:
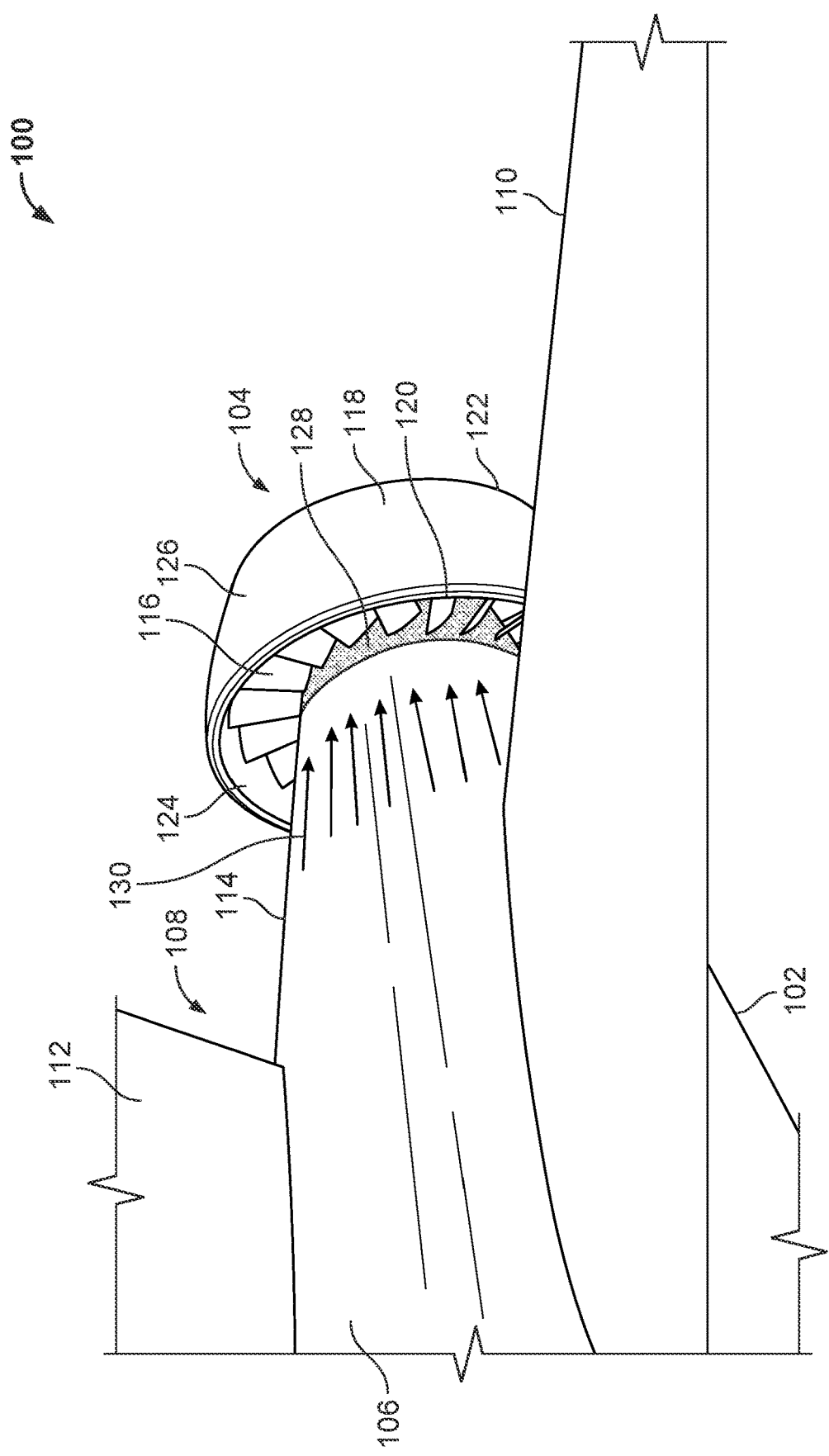
FIG. 1 is a perspective view of an example fuselage of an example aircraft, with the aircraft including an example ducted fan constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Drag resulting from the existence of a fuselage boundary layer is generally accepted as part of the overall drag associated with operating an aircraft. However, as drag increases the amount of fuel consumed when operating the aircraft, there is a persistent interest in the aircraft industry with regard to developing and implementing technologies designed to reduce drag, including reducing drag attributed to the existence of the fuselage boundary layer.

BLI is an area of aerodynamic research which focuses on reducing drag via a propeller configured to ingest the fuselage boundary layer, and to accelerate the associated airflow of the ingested fuselage boundary layer to a velocity that equals or exceeds the free stream velocity. A common characteristic among known BLI solutions is the requirement that one or more large, heavy, thrust-producing engine(s) be installed at the rear of the fuselage (e.g., proximate a tail of the aircraft), with the propeller of each such engine being configured to ingest the fuselage boundary layer and accelerate the associated airflow of the ingested fuselage boundary layer to a velocity that equals or exceeds the free stream velocity. Such known BLI solutions are typically not retrofittable to existing aircraft designs absent significant structural modifications to the aircraft.

Furthermore, while such known BLI solutions conceptually generate the aforementioned drag-reduction benefit associated with the fuselage boundary layer, the bulk (e.g., the size and/or weight) of the large, heavy, thrust-producing engine(s) required by such known BLI solutions introduces its own system penalties on the aircraft. At a minimum, these system penalties undermine the drag-reduction benefit associated with the fuselage boundary layer. In many instances, these system penalties are of a magnitude that results in a negative tradeoff with regard to the overall operating costs of the aircraft when such known BLI solutions are implemented.

Unlike the known BLI solutions described above which require the installation of one or more large, heavy, thrust-producing engine(s) at the rear of the fuselage of the aircraft, the methods and apparatus disclosed herein ingest and accelerate an aircraft fuselage boundary layer via a fan that is operatively coupled to (e.g., in electrical communication with) the APU of the aircraft. The disclosed methods and apparatus advantageously implement a fan having a bulk (e.g., a size and/or a weight) that is substantially less than the bulk of the large, heavy, thrust-producing engine(s) required by known BLI solutions.

The disclosed methods and apparatus advantageously leverage electrical energy produced by the APU of the aircraft as a source for powering the fan. In some examples, the energy required by the APU for powering the fan to produce a fuselage boundary layer drag-reduction benefit is less than the energy dissipated in the drag wake of the fuselage, thereby producing a positive tradeoff with regard to the overall fuel consumption and/or operating costs of the aircraft. In some such examples, the bulk (e.g., the size and/or the weight) of the fan is optimized such that the disclosed methods and apparatus reduce (e.g., substantially eliminate) the velocity deficit without producing a net velocity gain relative to the free stream velocity at the fuselage. The disclosed methods and apparatus accordingly implement a fan which is not a thrust-producing engine, and/or which does not generate thrust for the aircraft.

In some examples, the disclosed methods and apparatus for ingesting and accelerating an aircraft fuselage boundary layer utilize structural components that are retrofittable with, and/or easily incorporated into, one or more existing aircraft design(s). In such examples, the disclosed methods and apparatus can advantageously be implemented on an existing aircraft and/or incorporated into an existing aircraft design without making significant structural modifications to the aircraft.

Figure 2:
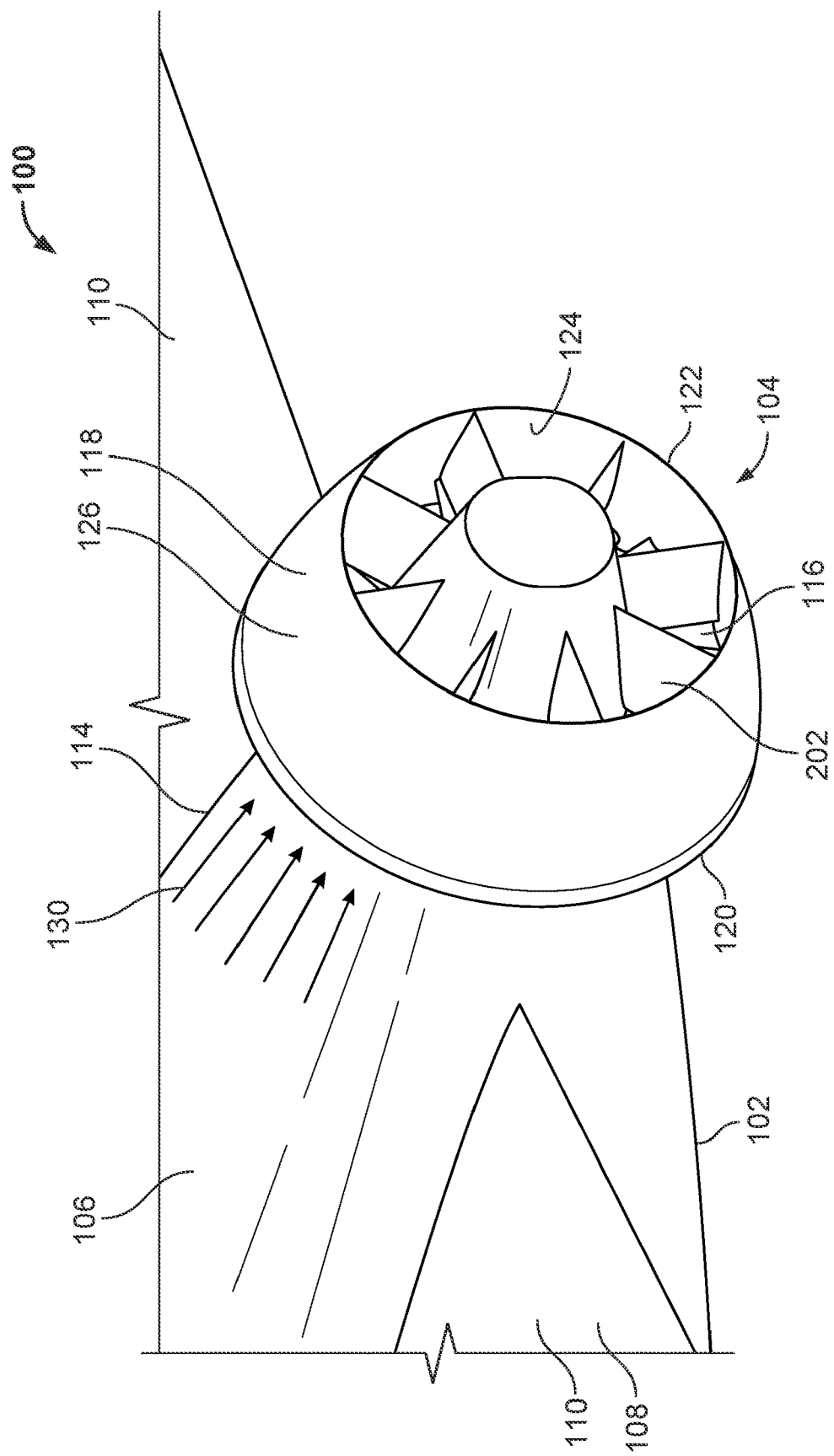
FIG. 2 is another perspective view of the fuselage of the aircraft of FIG. 1.

FIG. 1 is a perspective view of an example fuselage 102 of an example aircraft 100, with the aircraft 100 including an example ducted fan 104 constructed in accordance with the teachings of this disclosure. FIG. 2 is another perspective view of the fuselage 102 of the aircraft 100 of FIG. 1. The views shown in FIGS. 1 and 2 focus on an example rear section 106 of the fuselage 102 of the aircraft 100. In the illustrated example of FIGS. 1 and 2, the rear section 106 and/or, more generally, the aircraft 100 includes an example tail 108 having example horizontal stabilizers 110 and an example vertical stabilizer 112 respectively coupled to and projecting outward from the fuselage 102. As shown in FIGS. 1 and 2, the ducted fan 104 is located along the rear section 106 of the fuselage 102 at a position that is rearward (e.g., aft) of the root ends of the horizontal stabilizers 110 and/or rearward (e.g., aft) of the root end of the vertical stabilizer 112. In other examples, the aircraft 100 may lack the horizontal stabilizers 110, the vertical stabilizer 112, and/or, more generally, the tail 108 shown in FIGS. 1 and 2. In such other examples, the position at which the ducted fan 104 is located along the rear section 106 of the fuselage 102 may remain substantially the same as that shown in FIGS. 1 and 2.

The fuselage 102 of FIGS. 1 and 2 includes an example outer skin 114. The aircraft 100 of FIGS. 1 and 2 includes an APU (e.g., the APU 302 of FIG. 3, the APU 402 of FIG. 4, the APU 502 of FIG. 5, the APU 602 of FIG. 6, etc.) located within the fuselage 102 and circumscribed by the outer skin 114 of the fuselage 102. The APU of the aircraft 100 powers the ducted fan 104 by supplying electrical energy to a fan drive of the ducted fan 104, as further described below. In other examples, one or more component(s) of the aircraft 100 other than and/or in addition to the APU can power the ducted fan 104. For example, one or more main engine(s) of the aircraft 100 can additionally or alternatively power the ducted fan 104 by supplying electrical energy to a fan drive of the ducted fan 104.

In the illustrated example of FIGS. 1 and 2, the ducted fan 104 includes a plurality of example fan blades 116 and an example duct 118. The fan blades 116 of the ducted fan 104 are arranged circumferentially about the APU of the aircraft 100 and/or circumferentially about the outer skin 114 of the fuselage 102, with the fan blades 116 projecting radially outward from the outer skin 114. The duct 118 of the ducted fan 104 circumscribes the fan blades 116 of the ducted fan 104. The duct 118 is coupled to the outer skin 114 of the fuselage 102 via a plurality of example duct support struts 202. The duct support struts 202 of the ducted fan 104 are arranged circumferentially about the APU of the aircraft 100 and/or circumferentially about the outer skin 114 of the fuselage 102, with the duct support struts 202 projecting radially outward from the outer skin 114. In the illustrated example of FIGS. 1 and 2, the duct support struts 202 are located rearward of the fan blades 116. In other examples, the duct support struts 202 can additionally or alternatively be located forward of the fan blades 116. In the illustrated example of FIGS. 1 and 2, the duct support struts 202 are advantageously configured (e.g., sized, shaped, and/or structured) as de-swirl vanes for the ducted fan 104.

The duct 118 of FIGS. 1 and 2 includes an example leading edge 120, and example trailing edge 122, an example inner surface 124 facing radially inward toward the outer skin 114 of the fuselage 102, and an example outer surface 126 located opposite the inner surface 124 and facing radially outward away from the outer skin 114 of the fuselage 102. The duct 118 has a diameter defined by the maximum radial extent of the outer surface 126 of the duct 118 (e.g., at a location proximate the leading edge 120 of the duct 118), and a length defined by a axial distance between the leading edge 120 and the trailing edge 122 of the duct 118. In the illustrated example of FIGS. 1 and 2, the diameter of the duct 118 is less than or equal to four feet. In such an example, the diameter of the fan blades 116 (e.g., as defined by the maximum radial extent of the fan blades 116) which are circumscribed by the duct 118 is accordingly also less than four feet. In other examples, the diameter of the duct 118 and/or the diameter of the fan blades 116 can be greater than four feet. In the illustrated example of FIGS. 1 and 2, the length of the duct 118 is less than the diameter of the duct 118. In other examples, the length of the duct 118 can be greater than or equal to the diameter of the duct 118.

The ducted fan 104 of FIGS. 1 and 2 further includes an example hub ring 128 rotatably coupled (e.g., via one or more rotational bearing(s), such as one or more slewing ring bearing(s)) to the fuselage 102 of the aircraft 100. In the illustrated example of FIGS. 1 and 2, the fan blades 116 of the ducted fan 104 extend through the hub ring 128 and radially outward toward the inner surface 124 of the duct 118. The hub ring 128 is rotatable relative to the fuselage 102. The fan blades 116 and the hub ring 128 of FIGS. 1 and 2 are operatively coupled together (e.g., via one or more direct or linked mechanical connection(s)) and respectively configured (e.g., sized, shaped, and/or structured) to rotate as an integral unit, as further described below in connection with the example configurations of the ducted fan 104 shown in FIGS. 3-6. In the illustrated example of FIGS. 1 and 2, an outer surface of the hub ring 128 is aligned with (e.g., is flush with) the outer skin 114 of the fuselage 102. In other examples, the outer surface of the hub ring 128 can be radially offset (e.g., radially inward, or radially outward) from the outer skin 114 of the fuselage 102.

Figure 3:
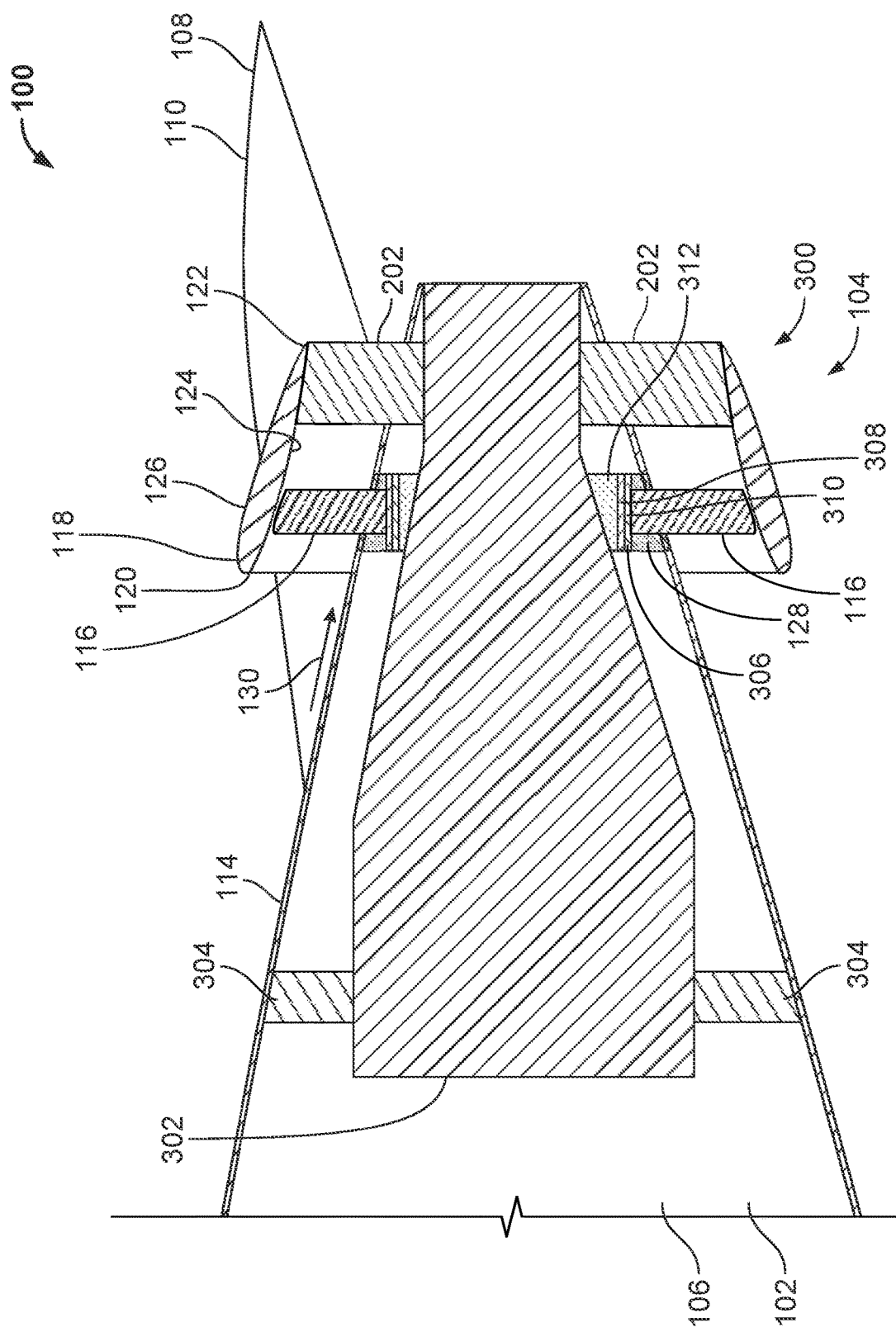
FIG. 3 is a side cross-sectional view of the fuselage of the aircraft of FIGS. 1 and 2 illustrating a first example configuration of the ducted fan of FIGS. 1 and 2.
Figure 4:
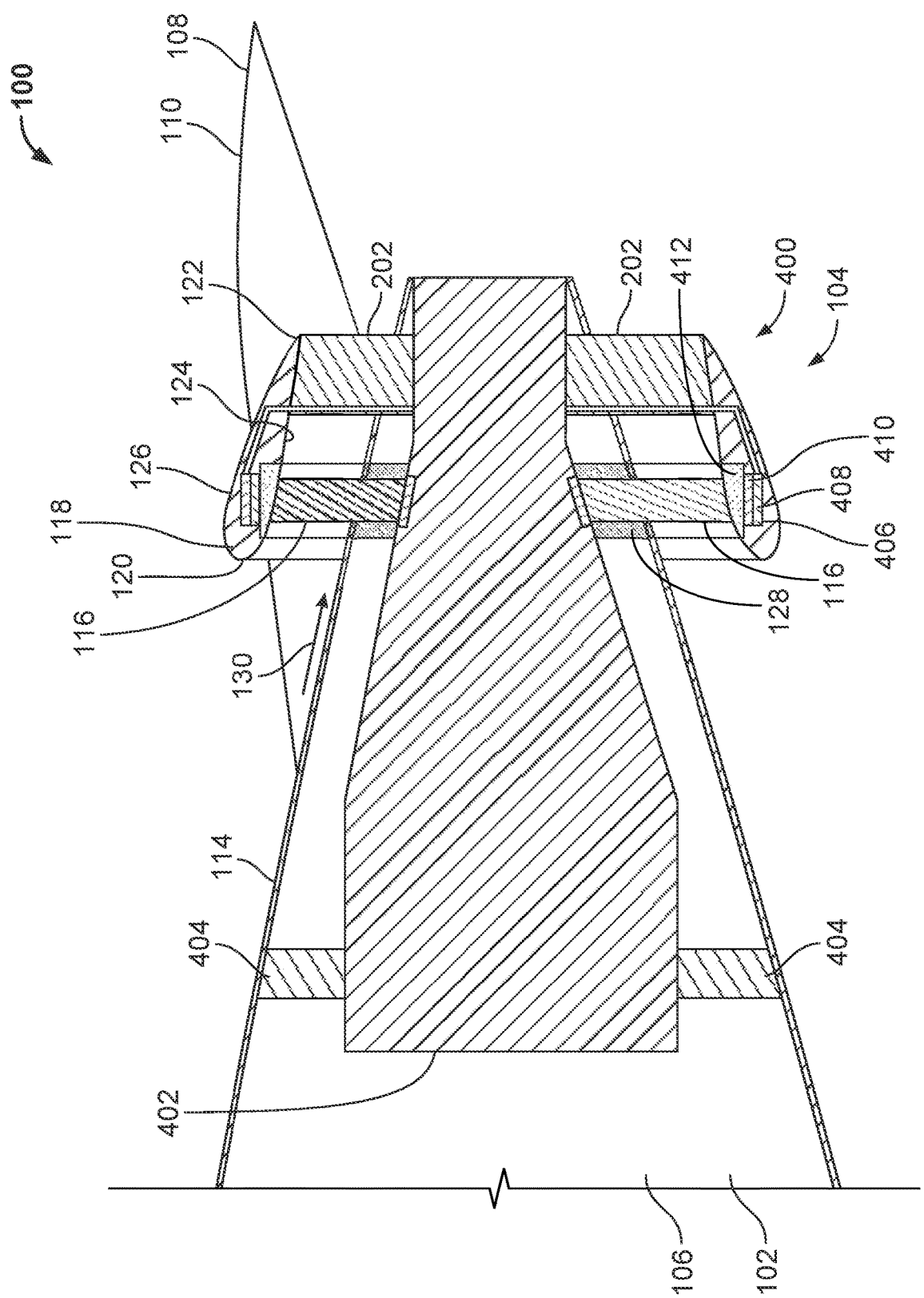
FIG. 4 is a side cross-sectional view of the fuselage of the aircraft of FIGS. 1 and 2 illustrating a second example configuration of the ducted fan of FIGS. 1 and 2.
Figure 5:
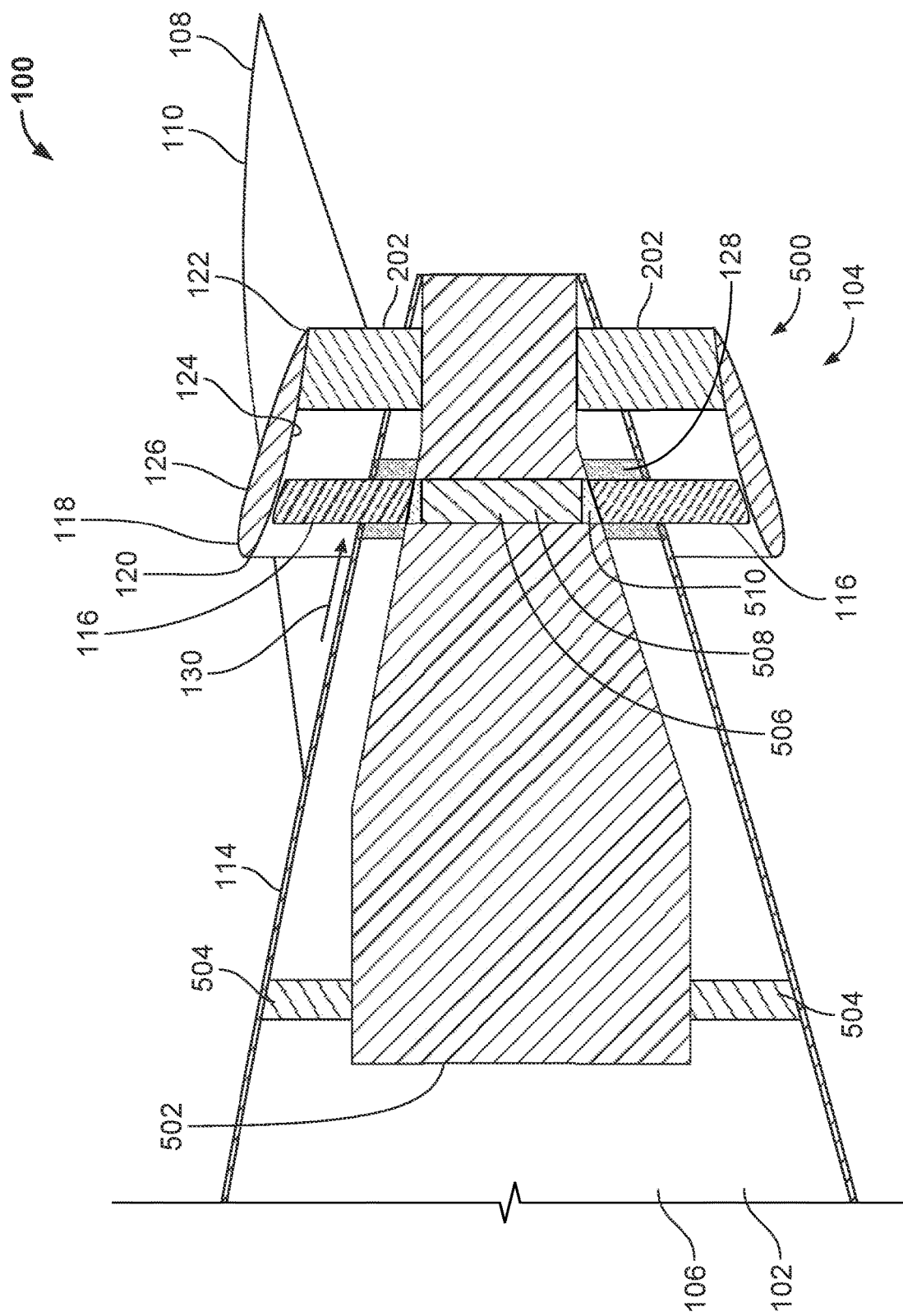
FIG. 5 is a side cross-sectional view of the fuselage of the aircraft of FIGS. 1 and 2 illustrating a third example configuration of the ducted fan of FIGS. 1 and 2.
Figure 6:
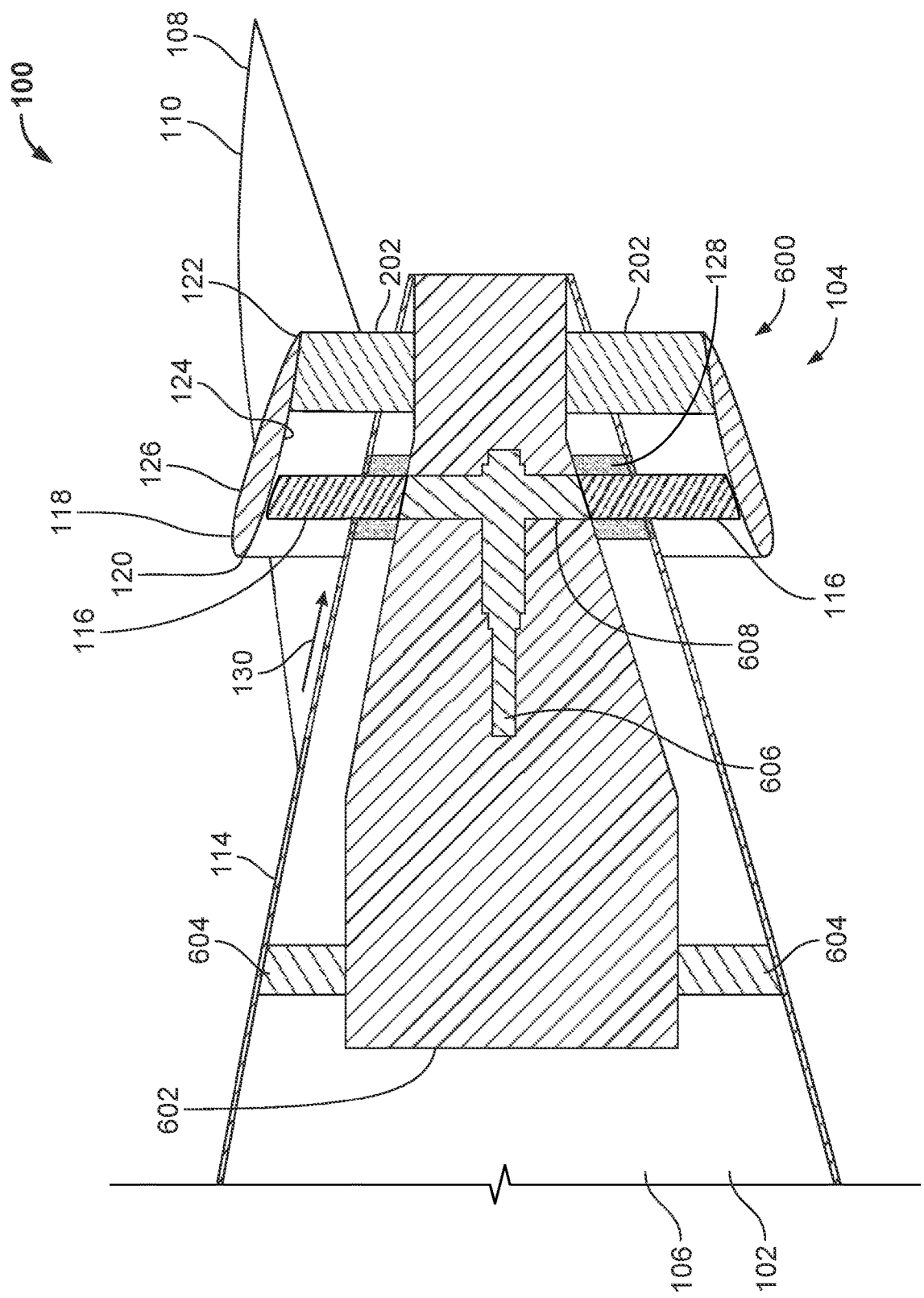
FIG. 6 is a side cross-sectional view of the fuselage of the aircraft of FIGS. 1 and 2 illustrating a fourth example configuration of the ducted fan of FIGS. 1 and 2.

The ducted fan 104 of FIGS. 1 and 2 further includes a fan drive (e.g., the electric ring motor 306 of FIG. 3, the electric ring motor 406 of FIG. 4, the electric motor 506 of FIG. 5, the turboshaft 606 of FIG. 6, etc.). The fan drive of the ducted fan 104 is operatively coupled (e.g., via one or more wire(s) and/or electrical conduit(s)) to the APU of the aircraft 100, and is further operatively coupled (e.g., via one or more direct or linked mechanical connection(s)) to the fan blades 116 of the ducted fan 104. The fan drive is configured (e.g., sized, shaped, and/or structured) to rotate the fan blades 116 in response to a supply of electrical energy provided to the fan drive from the APU of the aircraft 100. When the aircraft 100 of FIGS. 1 and 2 is in flight, an example fuselage boundary layer 130 routinely forms along the outer skin 114 of the fuselage 102 at a location forward of the ducted fan 104. The fuselage boundary layer 130 travels along the outer skin 114 of the fuselage 102 in a rearward direction.

Prior to being ingested into the ducted fan 104 (e.g., via the rotating fan blades 116 of the ducted fan 104), the fuselage boundary layer 130 has a pre-entry velocity (v1) that is less than a free stream velocity (vFS) at the fuselage 102. Rotation of the fan blades 116 of the ducted fan 104 via the fan drive of the ducted fan 104 causes the fuselage boundary layer 130 to be ingested into the ducted fan 104 (e.g., via the rotating fan blades 116), and to be accelerated to an exit velocity (v2) emerging from the ducted fan 104 that is greater than the pre-entry velocity (v1). In the illustrated example of FIGS. 1 and 2, the ducted fan 104 operates in a manner that causes the exit velocity (v2) of the fuselage boundary layer 130 not only to be greater than the pre-entry velocity (v1), but also to be less than or equal to (i.e., not greater than) the free stream velocity (vFS) at the fuselage 102. Thus, the ducted fan 104 of FIGS. 1 and 2 operates in manner that does not generate thrust for the aircraft 100. Stated differently, the ducted fan 104 of FIGS. 1 and 2 is not structured as a thrust-producing engine for the aircraft 100. In other examples, the ducted fan 104 can operate in a manner that generates a small degree of thrust for the aircraft 100 (e.g., minimal thrust relative to that which might be produced by a main engine of the aircraft 100).

The aircraft 100 of FIGS. 1 and 2 further includes a control system (e.g., the control system 1100 of FIG. 11 described below) having a controller that controls, manages, regulates, and/or adjusts one or more aspect(s) of the operation of the fan drive of the ducted fan 104. For example, the controller can be configured to control, manage, regulate, and/or adjust the amount of electrical energy supplied from the APU of the aircraft 100 to the fan drive of the ducted fan 104. As another example, the controller can additionally or alternatively be configured to control, manage, regulate, and/or adjust a rotational speed of the fan drive of the ducted fan 104. In some examples, the controller causes a rotor of the fan drive of the ducted fan 104 to rotate at specific speeds (e.g., specific angular velocities) and/or specific times based on the extent and/or degree of the controlled electrical energy supplied from the APU of the aircraft 100 the fan drive of the ducted fan 104 via the controller, and/or based on the timing at which the controller provides such controlled electrical energy to the fan drive of the ducted fan 104.

In some examples, one or more control signal(s), control command(s), and/or control output(s) generated by the controller (e.g., to be transmitted to and/or received at the APU of the aircraft 100 and/or the fan drive of the ducted fan 104) is/are based on one or more end user (e.g., aircraft pilot) input(s) facilitated via a user interface of the control system of the aircraft 100. In such examples, one or more operation(s) of the controller, the fan drive, and/or the ducted fan 104 may occur in response to the end user input(s). In other examples, one or more control signal(s), control command(s), and/or control output(s) generated by the controller (e.g., to be transmitted to and/or received at the APU of the aircraft 100 and/or the fan drive of the ducted fan 104) is/are based on data detected by one or more sensor(s) of the control system of the aircraft 100. In such examples, one or more operation(s) of the controller, the fan drive, and/or the ducted fan 104 may occur automatically (e.g., without end user input and/or end user intervention) in response to the data detected by the sensor(s).

In some examples, the fan blades 116, the hub ring 128, and a rotor of the fan drive of the ducted fan 104 are freely rotatable when the fan drive is not actively powered (e.g., when the fan drive and/or, more generally, the ducted fan 104 is turned off). In such examples, non-powered rotation of the fan blades 116, the hub ring 128, and the rotor of the fan drive of the ducted fan 104 can occur in response to force applied by the fuselage boundary layer 132 and/or the surrounding free stream against the fan blades 116 of the ducted fan 104. In such examples, the non-powered rotation of the fan blades 116, the hub ring 128, and the rotor of the fan drive of the ducted fan 104 generates mechanical energy that can be converted to electrical energy and/or electrical power for the aircraft 100. Thus, the ducted fan 104 can advantageously operate as a windmill when the fan drive and/or, more generally, the ducted fan 104 is not actively powered (e.g., turned off).

FIG. 3 is a side cross-sectional view of the fuselage 102 of the aircraft 100 of FIGS. 1 and 2 illustrating a first example configuration 300 of the ducted fan 104 of FIGS. 1 and 2. In the illustrated example of FIG. 3, an example APU 302 of the aircraft 100 can be seen located within the fuselage 102. The APU 302 of the aircraft 100 is circumscribed by the outer skin 114 of the fuselage 102. The APU 302 is coupled to and/or supported within the fuselage 102 via example APU support struts 304. The above-described duct support struts 202 of the aircraft 100 extend radially inward through the outer skin 114 of the fuselage 102 to the APU 302 such that the duct support struts 202 couple the duct 118 of the ducted fan 104 to the APU 302.

In the illustrated example of FIG. 3, the ducted fan 104 includes a fan drive implemented and/or configured as an example electric ring motor 306. The electric ring motor 306 of FIG. 3 is operatively coupled (e.g., via one or more wire(s) and/or electrical conduit(s)) to the APU 302 of the aircraft 100, and is further operatively coupled (e.g., via one or more direct or linked mechanical connection(s)) to the fan blades 116 of the ducted fan 104. The electric ring motor 306 of FIG. 3 is configured (e.g., sized, shaped, and/or structured) to rotate the fan blades 116 of the ducted fan 104 about the fuselage 102 and/or the APU 302 of the aircraft 100 in response to a supply of electrical energy provided to the electric ring motor 306 from the APU 302.

The electric ring motor 306 of FIG. 3 includes an example stator 308 and an example rotor 310, both of which circumscribe the APU 302 of the aircraft 100. The stator 308 is stationary. The rotor 310 is configured (e.g., sized, shaped, and/or structured) to move (e.g., rotate) relative to the stator 308. In the illustrated example of FIG. 3, the rotor 310 rotates relative to the stator 308 in response to electrical energy supplied to the stator 308 from the APU 302 of the aircraft 100. In some examples, the supply of electrical energy from the APU 302 to the stator 308 is controlled, managed, regulated, and/or adjusted via a controller of a control system of the aircraft 100, as further described below.

In the illustrated example of FIG. 3, the electric ring motor 306 is located within the fuselage 102 in an annular manner between the APU 302 and the outer skin 114 of the fuselage 102. For example, as shown in FIG. 3, the electric ring motor 306 is radially located between the APU 302 and the outer skin 114 of the fuselage 102, with the electric ring motor 306 circumscribing the APU 302, and with the outer skin 114 of the fuselage 102 circumscribing the electric ring motor 306. As further shown in FIG. 3, the rotor 310 of the electric ring motor 306 circumscribes the stator 308 of the electric ring motor 306. Example insulation 312 is located within the fuselage 102 in an annular manner between the APU 302 and the electric ring motor 306 to provide an insulative barrier between the APU 302 and the electric ring motor 306.

The rotor 310 of the electric ring motor 306 of FIG. 3 is operatively coupled (e.g., via one or more direct or linked mechanical connection(s)) to the fan blades 116 and/or the hub ring 128 of the ducted fan 104 such that the rotor 310, the fan blades 116, and the hub ring 128 rotate together as an integral unit. In this regard, the fan blades 116 and the hub ring 128 are respectively located radially outward relative to the rotor 310, with the fan blades 116 extending radially outward from the rotor 310 and/or from the hub ring 128 to and/or toward the inner surface 124 of the duct 118. In the illustrated example of FIG. 3, the fan blades 116, the duct 118, and/or, more generally, the ducted fan 104 has/have a diameter that is less than or equal to four feet. In other examples, the fan blades 116, the duct 118, and/or, more generally, the ducted fan 104 can have a diameter that is greater than four feet.

FIG. 4 is a side cross-sectional view of the fuselage 102 of the aircraft 100 of FIGS. 1 and 2 illustrating a second example configuration 400 of the ducted fan 104 of FIGS. 1 and 2. In the illustrated example of FIG. 4, an example APU 402 of the aircraft 100 can be seen located within the fuselage 102. The APU 402 of the aircraft 100 is circumscribed by the outer skin 114 of the fuselage 102. The APU 402 is coupled to and/or supported within the fuselage 102 via example APU support struts 404. The above-described duct support struts 202 of the aircraft 100 extend radially inward through the outer skin 114 of the fuselage 102 to the APU 402 such that the duct support struts 202 couple the duct 118 of the ducted fan 104 to the APU 402.

In the illustrated example of FIG. 4, the ducted fan 104 includes a fan drive implemented and/or configured as an example electric ring motor 406. The electric ring motor 406 of FIG. 4 is operatively coupled (e.g., via one or more wire(s) and/or electrical conduit(s) to the APU 402 of the aircraft 100, and is further operatively coupled (e.g., via one or more direct or linked mechanical connection(s)) to the fan blades 116 of the ducted fan 104. The electric ring motor 406 of FIG. 4 is configured (e.g., sized, shaped, and/or structured) to rotate the fan blades 116 of the ducted fan 104 about the fuselage 102 and/or the APU 402 of the aircraft 100 in response to a supply of electrical energy provided to the electric ring motor 406 from the APU 402.

The electric ring motor 406 of FIG. 4 includes an example stator 408 and an example rotor 410, both of which circumscribe the APU 402 of the aircraft 100. The stator 408 is stationary. The rotor 410 is configured (e.g., sized, shaped, and/or structured) to move (e.g., rotate) relative to the stator 408. In the illustrated example of FIG. 4, the rotor 310 rotates relative to the stator 408 in response to electrical energy supplied to the stator 408 from the APU 402 of the aircraft 100. In some examples, the supply of electrical energy from the APU 402 to the stator 308 is controlled, managed, regulated, and/or adjusted via a controller of a control system of the aircraft 100, as further described below.

In the illustrated example of FIG. 4, the rotor 410 of the electric ring motor 406 is located within the duct 118 of the ducted fan 104. For example, as shown in FIG. 4, the rotor 410 is axially located between the leading edge 120 and the trailing edge 122 of the duct 118, and radially located between the inner surface 124 and the outer surface 126 of the duct 118, with the rotor 410 circumscribing the inner surface 124 of the duct 118, and with the outer surface 126 of the duct 118 circumscribing the rotor 410. As further shown in FIG. 4, at least a portion of the stator 408 of the electric ring motor 406 is also located within the duct 118 of the ducted fan 104 (e.g., axially located between the leading edge 120 and the trailing edge 122 of the duct 118, and radially located between the inner surface 124 and the outer surface 126 of the duct 118), with the stator 408 of the electric ring motor 406 circumscribing the rotor 410 of the electric ring motor 406. In some examples, at least a portion of the stator 408 can be implemented via the duct support struts 202. Thus, the duct support struts 202 can advantageously be configured (e.g., sized, shaped, and/or structured) to implement: (1) a support structure for the duct 118 of the ducted fan 104 relative to the fuselage 102 of the aircraft 100; (2) de-swirl vanes for the ducted fan 104; and (3) a portion of the stator 408 of the electric ring motor 406 of the ducted fan 104.

In the illustrated example of FIG. 4, the above-described hub ring 128 of the ducted fan 104 is a first hub ring 128. The ducted fan 104 of FIG. 4 further includes an example second hub ring 412 circumscribing the first hub ring 128 and rotatably coupled (e.g., via one or more rotational bearing(s), such as one or more slewing ring bearing(s)) to the duct 118 of the ducted fan 104. The fan blades 116 of the ducted fan 104 extend between the first hub ring 128 and the second hub ring 412 (e.g., such that the fan blades 116 contact and/or pass through both the first hub ring 128 and the second hub ring 412). The first hub ring 128 is rotatable relative to the fuselage 102, and the second hub ring 412 is rotatable relative to the duct 118. The fan blades 116, the first hub ring 128, and the second hub ring 412 of FIG. 4 are operatively coupled together (e.g., via one or more direct or linked mechanical connection(s)) and respectively configured (e.g., sized, shaped, and/or structured) to rotate as an integral unit. In the illustrated example of FIG. 4, an inner surface of the second hub ring 412 is aligned with (e.g., is flush with) the inner surface 124 of the duct 118. In other examples, the inner surface of the second hub ring 412 can be radially offset (e.g., radially inward, or radially outward) from the inner surface 124 of the duct 118.

The rotor 410 of the electric ring motor 406 of FIG. 4 is operatively coupled (e.g., via one or more direct or linked mechanical connection(s)) to the fan blades 116 and/or the second hub ring 412 of the ducted fan 104 such that the rotor 410, the fan blades 116, and the second hub ring 412 rotate together as an integral unit. In this regard, the fan blades 116 and the second hub ring 412 are respectively located radially inward relative to the rotor 410, with the fan blades 116 extending radially inward from the rotor 410 and/or from the second hub ring 412 to and/or toward the first hub ring 128 of the ducted fan 104. In the illustrated example of FIG. 4, the first hub ring 128 of the ducted fan 104 is also operatively coupled (e.g., via one or more direct or linked mechanical connection(s)) to the fan blades 116 of the ducted fan 104. Thus, the first hub ring 128 also rotates as an integral unit along with the rotor 410, the second hub ring 412, and the fan blades 116 of the ducted fan 104. In the illustrated example of FIG. 4, the fan blades 116, the duct 118, the electric ring motor 406 and/or, more generally, the ducted fan 104 has/have a diameter that is less than or equal to four feet. In other examples, the fan blades 116, the duct 118, the electric ring motor 406 and/or, more generally, the ducted fan 104 can have a diameter that is greater than four feet.

FIG. 5 is a side cross-sectional view of the fuselage 102 of the aircraft 100 of FIGS. 1 and 2 illustrating a third example configuration 500 of the ducted fan 104 of FIGS. 1 and 2. In the illustrated example of FIG. 5, an example APU 502 of the aircraft 100 can be seen located within the fuselage 102. The APU 502 of the aircraft 100 is circumscribed by the outer skin 114 of the fuselage 102. The APU 502 is coupled to and/or supported within the fuselage 102 via example APU support struts 504. In some examples, the APU 502 of FIG. 5 can include an integrated secondary exhaust flow path structured in a manner similar to the integrated secondary flow path disclosed in U.S. Pat. No. 8,667,775.

In the illustrated example of FIG. 5, the ducted fan 104 includes a fan drive implemented and/or configured as an example electric motor 506 positioned in line with the APU 502. The electric motor 506 of FIG. 5 is operatively coupled (e.g., via one or more wire(s) and/or electrical conduit(s)) to the APU 502 of the aircraft 100, and is further operatively coupled (e.g., via one or more direct or linked mechanical connection(s)) to the fan blades 116 of the ducted fan 104. The electric motor 506 of FIG. 5 is configured (e.g., sized, shaped, and/or structured) to rotate the fan blades 116 of the ducted fan 104 about the fuselage 102 and/or the APU 502 of the aircraft 100 in response to a supply of electrical energy provided to the electric motor 506 from the APU 502.

The electric motor 506 of FIG. 5 includes an example stator 508 and an example rotor 510. The stator 508 is stationary. The rotor 510 is configured (e.g., sized, shaped, and/or structured) to move (e.g., rotate) relative to the stator 508. In the illustrated example of FIG. 5, the rotor 510 rotates relative to the stator 508 in response to electrical energy supplied to the stator 508 from the APU 502 of the aircraft 100. In some examples, the supply of electrical energy from the APU 502 to the stator 508 is controlled, managed, regulated, and/or adjusted via a controller of a control system of the aircraft 100, as further described below.

In the illustrated example of FIG. 5, the rotor 510 of the electric motor 506 is operatively coupled (e.g., via one or more direct or linked mechanical connection(s)) to the fan blades 116 and/or the hub ring 128 of the ducted fan 104 such that the rotor 510, the fan blades 116, and the hub ring 128 rotate together as an integral unit. In this regard, the fan blades 116 and the hub ring 128 are respectively located radially outward relative to the rotor 510, with the fan blades 116 extending radially outward from the rotor 510 and/or from the hub ring 128. In the illustrated example of FIG. 5, the fan blades 116, the duct 118 and/or, more generally, the ducted fan 104 has/have a diameter that is less than or equal to four feet. In other examples, the fan blades 116, the duct 118 and/or, more generally, the ducted fan 104 can have a diameter that is greater than four feet.

FIG. 6 is a side cross-sectional view of the fuselage 102 of the aircraft 100 of FIGS. 1 and 2 illustrating a fourth example configuration 600 of the ducted fan 104 of FIGS. 1 and 2. In the illustrated example of FIG. 6, an example APU 602 of the aircraft 100 can be seen located within the fuselage 102. The APU 602 of the aircraft 100 is circumscribed by the outer skin 114 of the fuselage 102. The APU 602 is coupled to and/or supported within the fuselage 102 via example APU support struts 604. In some examples, the APU 602 of FIG. 6 can include an integrated secondary exhaust flow path structured in a manner similar to the integrated secondary flow path disclosed in U.S. Pat. No. 8,667,775.

In the illustrated example of FIG. 6, the ducted fan 104 includes a fan drive implemented and/or configured as an example turboshaft 606 positioned in line with the APU 602. The turboshaft 606 of FIG. 6 is operatively coupled (e.g., via one or more wire(s) and/or electrical conduit(s) to the APU 602 of the aircraft 100, and is further operatively coupled (e.g., via one or more direct or linked mechanical connection(s)) to the fan blades 116 of the ducted fan 104. The turboshaft 606 of FIG. 6 is configured (e.g., sized, shaped, and/or structured) to rotate the fan blades 116 of the ducted fan 104 about the fuselage 102 and/or the APU 602 of the aircraft 100 in response to a supply of electrical energy provided to the turboshaft 606 from the APU 602.

The turboshaft 606 of FIG. 6 includes an example rotor 608 that is configured (e.g., sized, shaped, and/or structured) to move (e.g., rotate) in response to electrical energy supplied to the turboshaft 606 from the APU 602 of the aircraft 100. In some examples, the supply of electrical energy from the APU 602 to the turboshaft 606 is controlled, managed, regulated, and/or adjusted via a controller of a control system of the aircraft 100, as further described below.

In the illustrated example of FIG. 6, the rotor 608 of the turboshaft 606 is operatively coupled (e.g., via one or more direct or linked mechanical connection(s)) to the fan blades 116 and/or the hub ring 128 of the ducted fan 104 such that the rotor 608, the fan blades 116, and the hub ring 128 rotate together as an integral unit. In this regard, the fan blades 116 and the hub ring 128 are respectively located radially outward relative to the rotor 608, with the fan blades 116 extending radially outward from the rotor 608 and/or from the hub ring 128. In the illustrated example of FIG. 6, the fan blades 116, the duct 118 and/or, more generally, the ducted fan 104 has/have a diameter that is less than or equal to four feet. In other examples, the fan blades 116, the duct 118 and/or, more generally, the ducted fan 104 can have a diameter that is greater than four feet.

Figure 7:
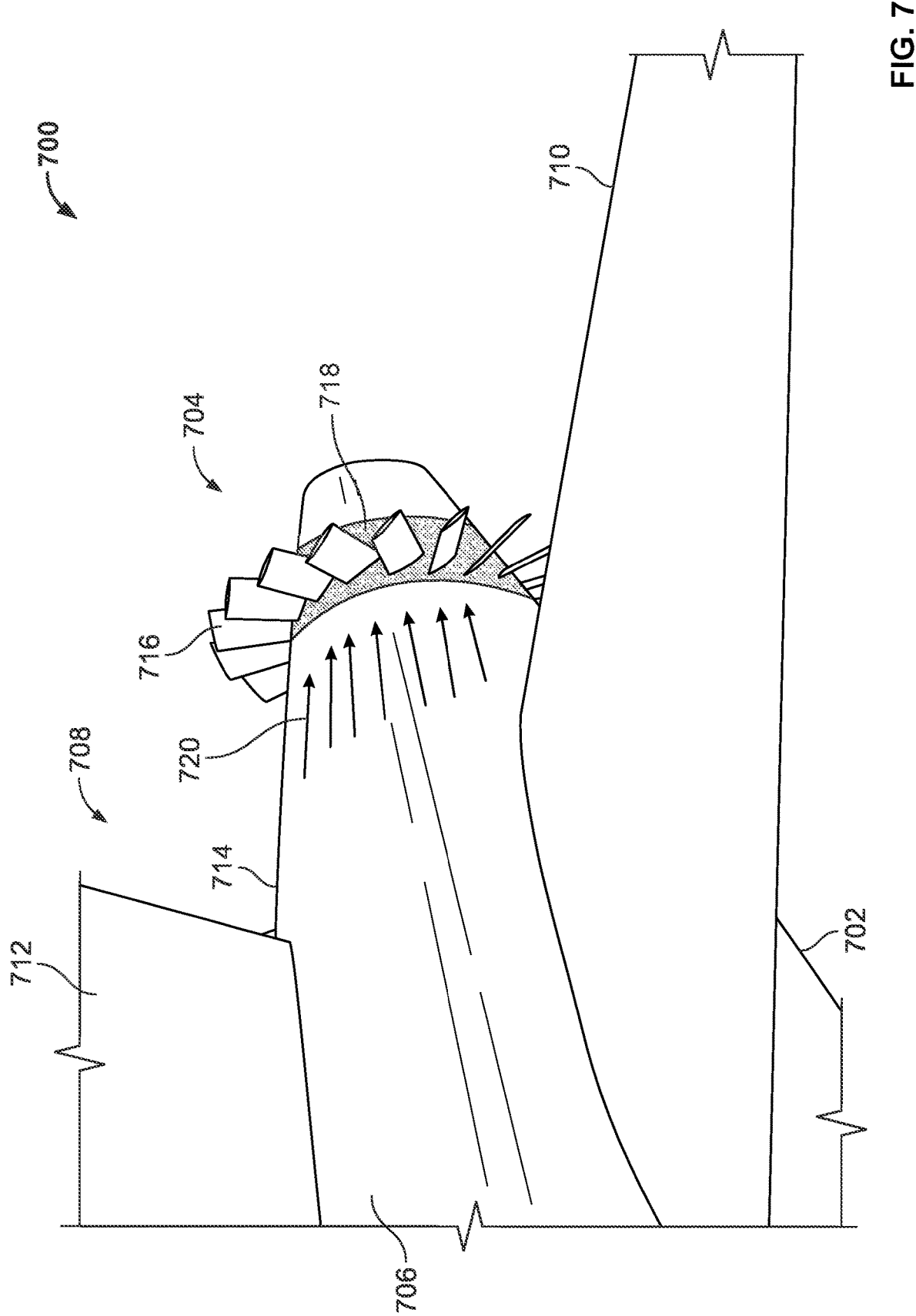
FIG. 7 is a perspective view of an example fuselage of an example aircraft, with the aircraft including an example unducted fan constructed in accordance with the teachings of this disclosure.

FIG. 7 is a perspective view of an example fuselage 702 of an example aircraft 700, with the aircraft 700 including an example unducted fan 704 constructed in accordance with the teachings of this disclosure. The view shown in FIG. 7 focuses on an example rear section 706 of the fuselage 702 of the aircraft 700. In the illustrated example of FIG. 7, the rear section 706 and/or, more generally, the aircraft 700 includes an example tail 708 having example horizontal stabilizers 710 and an example vertical stabilizer 712 respectively coupled to and projecting outwardly from the fuselage 702. As shown in FIG. 7, the unducted fan 704 is located along the rear section 706 of the fuselage 702 at a position that is rearward (e.g., aft) of the root ends of the horizontal stabilizers 710 and/or rearward (e.g., aft) of the root end of the vertical stabilizer 712. In other examples, the aircraft 700 may lack the horizontal stabilizers 710, the vertical stabilizer 712, and/or, more generally, the tail 708 shown in FIG. 7. In such other examples, the position at which the unducted fan 704 is located along the rear section 706 of the fuselage 702 may remain substantially the same as that shown in FIG. 7.

The fuselage 702 of FIG. 7 includes an example outer skin 714. The aircraft 700 of FIG. 7 includes an APU (e.g., the APU 802 of FIG. 8, the APU 902 of FIG. 9, the APU 1002 of FIG. 10, etc.) located within the fuselage 702 and circumscribed by the outer skin 714 of the fuselage 702. The APU of the aircraft 700 powers the unducted fan 704 of the aircraft 700 by supplying electrical energy to a fan drive of the unducted fan 704, as further described below. In other examples, one or more component(s) of the aircraft 700 other than and/or in addition to the APU can power the unducted fan 704. For example, one or more main engine(s) of the aircraft 700 can additionally or alternatively power the unducted fan 704 by supplying electrical energy to a fan drive of the unducted fan 704.

In the illustrated example of FIG. 7, the unducted fan 704 includes a plurality of example fan blades 716. The fan blades 716 of the unducted fan 704 are arranged circumferentially about the APU of the aircraft 700 and/or circumferentially about the outer skin 714 of the fuselage 702, with the fan blades 716 projecting radially outward from the outer skin 714. The unducted fan 704 has a diameter defined by the maximum radial extent of the fan blades 716. In the illustrated example of FIG. 7, the diameter of the unducted fan 704 is less than or equal to four feet. In other examples, the diameter of the unducted fan 704 can be greater than four feet.

The unducted fan 704 of FIG. 7 further includes an example hub ring 718 rotatably coupled (e.g., via one or more rotational bearing(s), such as one or more slewing ring bearing(s)) to the fuselage 702 of the aircraft 700. In the illustrated example of FIG. 7, the fan blades 716 of the unducted fan 704 project radially outward from the hub ring 718 (e.g., such that the fan blades 716 contact and/or pass through the hub ring 718). The hub ring 718 is rotatable relative to the fuselage 702. The fan blades 716 and the hub ring 718 of FIG. 7 are operatively coupled together (e.g., via one or more direct or linked mechanical connection(s)) and respectively configured (e.g., sized, shaped, and/or structured) to rotate as an integral unit, as further described below in connection with the example configurations of the unducted fan 704 shown in FIGS. 8-10. In the illustrated example of FIG. 7, an outer surface of the hub ring 718 is aligned with (e.g., is flush with) the outer skin 714 of the fuselage 702. In other examples, the outer surface of the hub ring 718 can be radially offset (e.g., radially inward, or radially outward) from the outer skin 714 of the fuselage 702.

Figure 8:
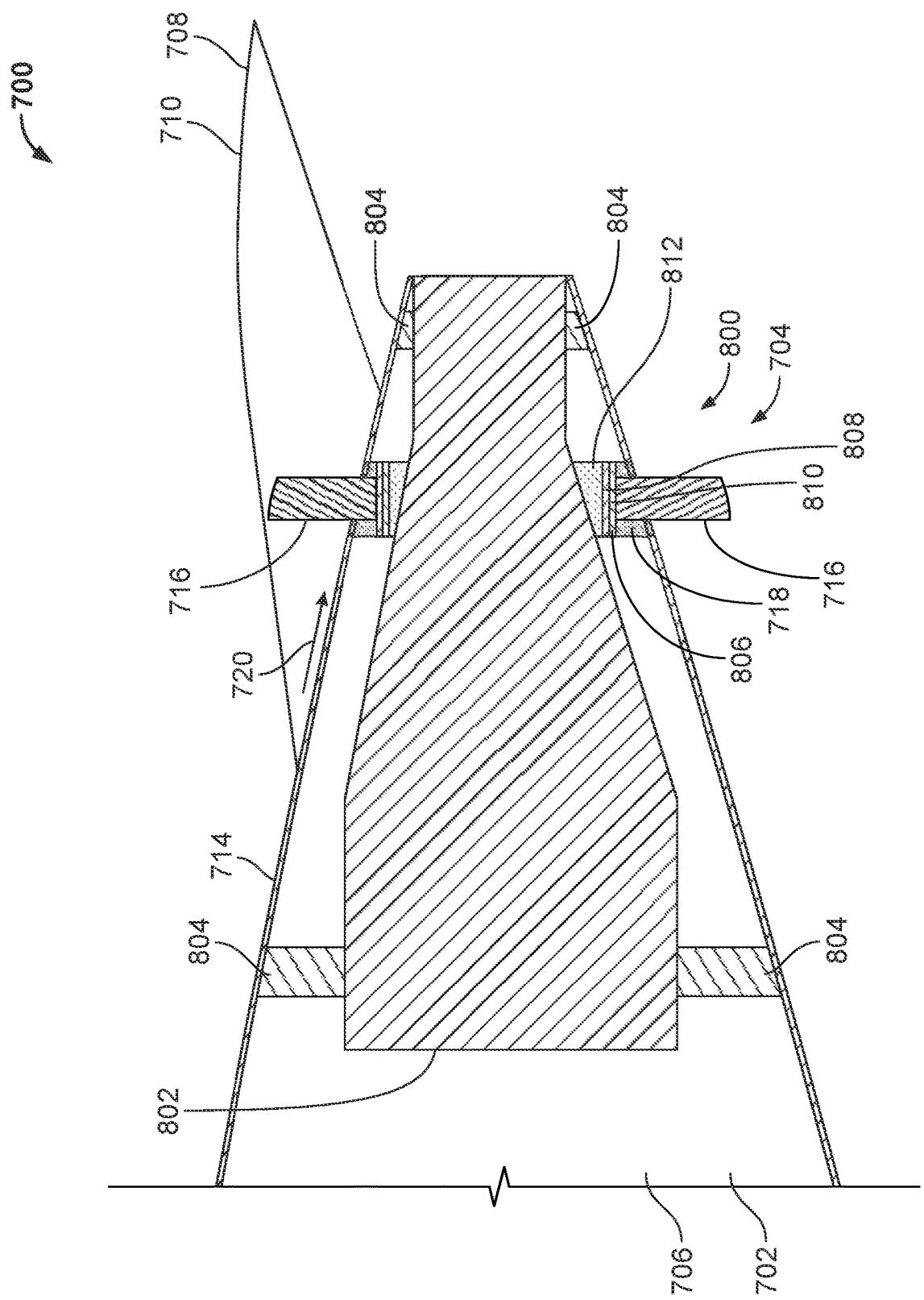
FIG. 8 is a side cross-sectional view of the fuselage of the aircraft of FIG. 7 illustrating a first example configuration of the unducted fan of FIG. 7.
Figure 9:
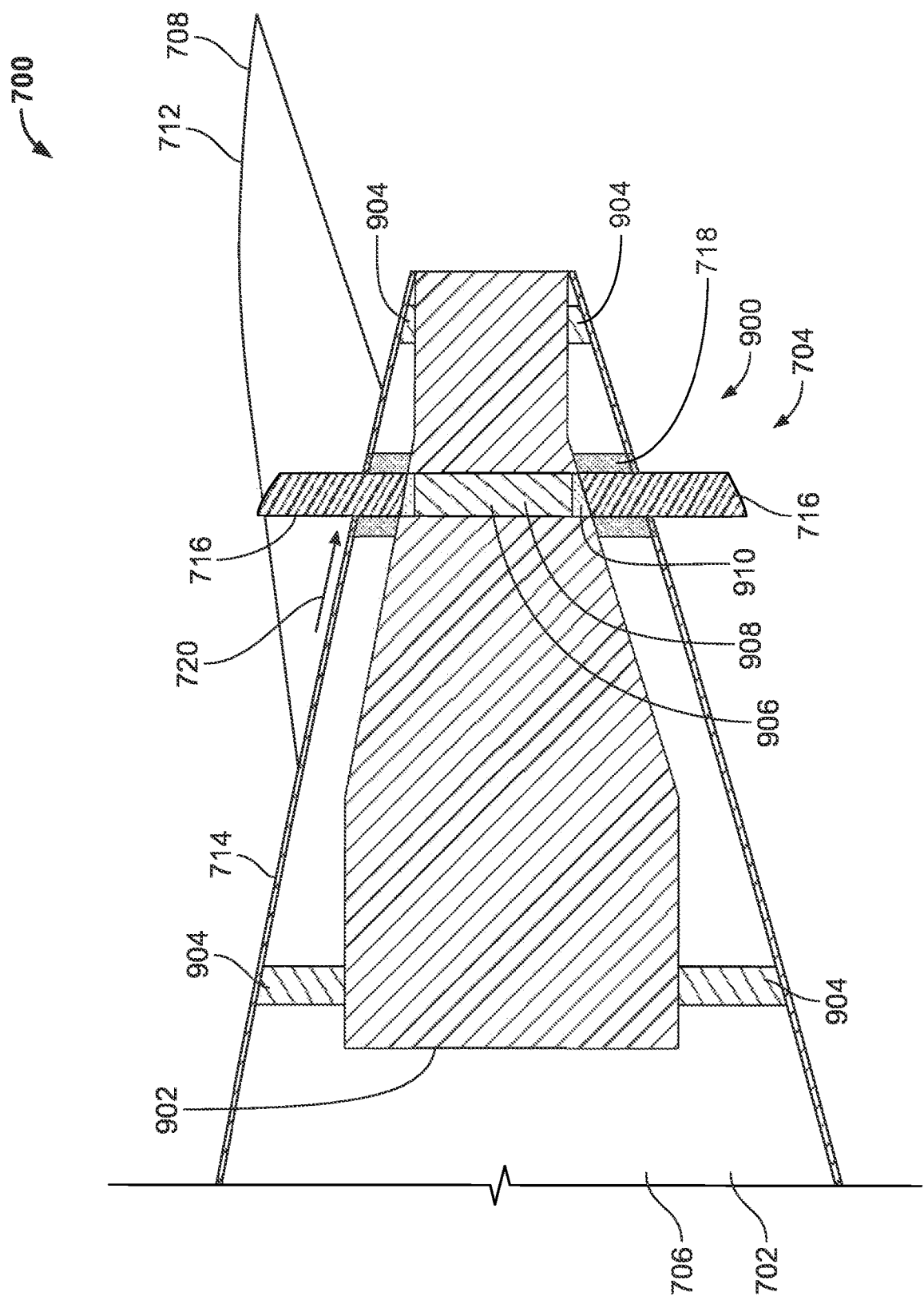
FIG. 9 is a side cross-sectional view of the fuselage of the aircraft of FIG. 7 illustrating a second example configuration of the unducted fan of FIG. 7.
Figure 10:
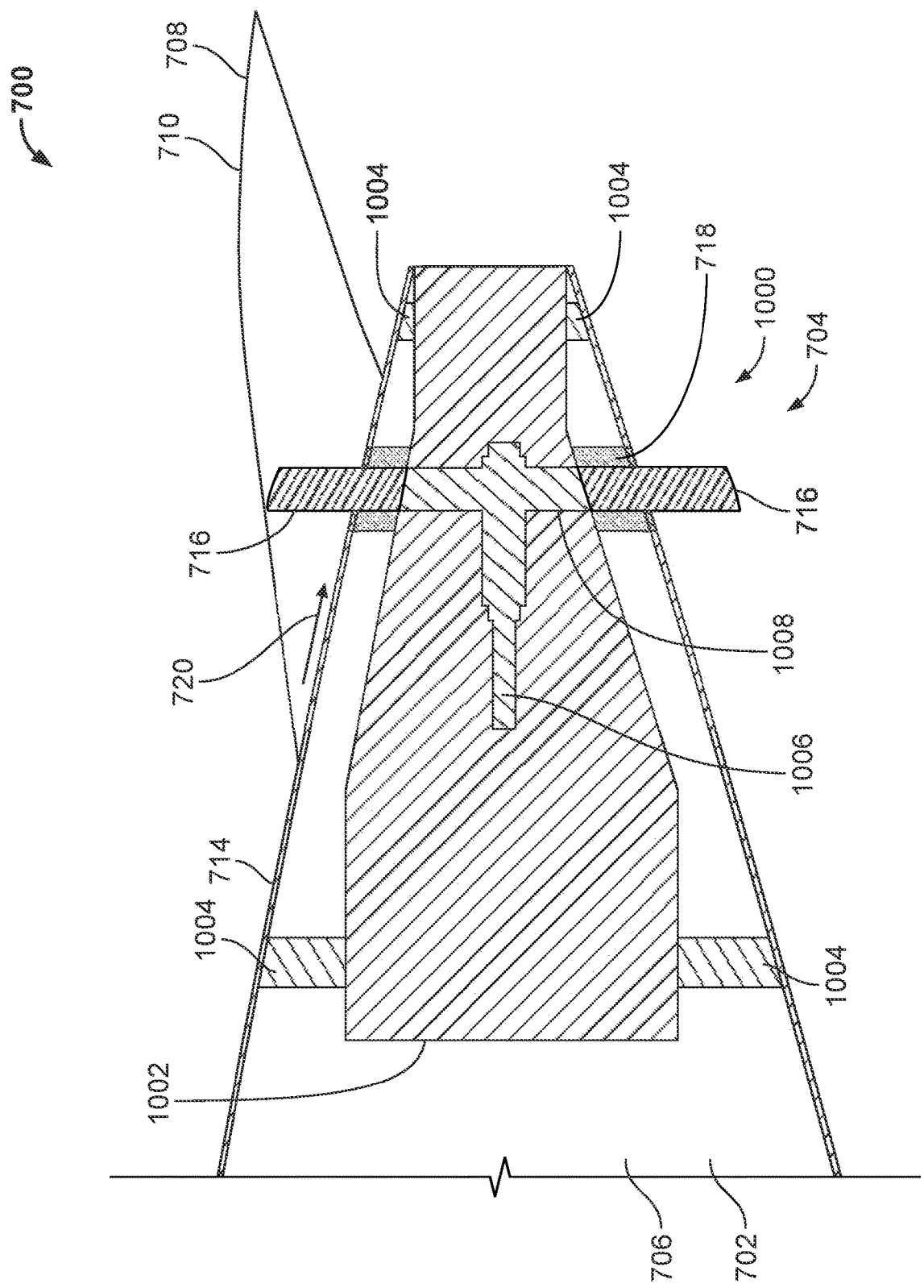
FIG. 10 is a side cross-sectional view of the fuselage of the aircraft of FIG. 7 illustrating a third example configuration of the unducted fan of FIG. 7.

The unducted fan 704 of FIG. 7 further includes a fan drive (e.g., the electric ring motor 806 of FIG. 8, the electric motor 906 of FIG. 9, the turboshaft 1006 of FIG. 10, etc.). The fan drive of the unducted fan 704 is operatively coupled (e.g., via one or more wire(s) and/or electrical conduit(s)) to the APU of the aircraft 700, and is further operatively coupled (e.g., via one or more direct or linked mechanical connection(s)) to the fan blades 716 of the unducted fan 704. The fan drive is configured (e.g., sized, shaped, and/or structured) to rotate the fan blades 716 in response to a supply of electrical energy provided to the fan drive from the APU. When the aircraft 700 of FIG. 7 is in flight, an example fuselage boundary layer 720 routinely forms along the outer skin 714 of the fuselage 702 at a location forward of the unducted fan 704. The fuselage boundary layer 720 travels along the outer skin 714 of the fuselage 702 in a rearward direction.

Prior to being ingested into the unducted fan 704 (e.g., via the rotating fan blades 716 of the unducted fan 704), the fuselage boundary layer 720 has a pre-entry velocity (v1) that is less than a free stream velocity (vFS) at the fuselage 702. Rotation of the fan blades 716 of the unducted fan 704 via the fan drive of the unducted fan 704 causes the fuselage boundary layer 720 to be ingested into the unducted fan 704 (e.g., via the rotating fan blades 716), and to be accelerated to an exit velocity (v2) emerging from the unducted fan 704 that is greater than the pre-entry velocity (v1). In the illustrated example of FIG. 7, the unducted fan 704 operates in a manner that causes the exit velocity (v2) of the fuselage boundary layer 720 not only to be greater than the pre-entry velocity (v1), but also to be less than or equal to (i.e., not greater than) the free stream velocity (vFS) at the fuselage 702. Thus, the unducted fan 704 of FIG. 7 operates in manner that does not generate thrust for the aircraft 700. Stated differently, the unducted fan 704 of FIG. 7 is not structured as a thrust-producing engine for the aircraft 700. In other examples, the unducted fan 704 can operate in a manner that generates a small degree of thrust for the aircraft 700 (e.g., minimal thrust relative to that which might be produced by a main engine of the aircraft 700).

The aircraft 700 of FIG. 7 further includes a control system (e.g., the control system 1100 of FIG. 11 described below) having a controller that controls, manages, regulates, and/or adjusts one or more aspect(s) of the operation of the fan drive of the unducted fan 704. For example, the controller can be configured to control, manage, regulate, and/or adjust the amount of electrical energy supplied from the APU of the aircraft 700 to the fan drive of the unducted fan 704. As another example, the controller can additionally or alternatively be configured to control, manage, regulate, and/or adjust a rotational speed of the fan drive of the unducted fan 704. In some examples, the controller causes a rotor of the fan drive of the unducted fan 704 to rotate at specific speeds (e.g., specific angular velocities) and/or specific times based on the extent and/or degree of the controlled electrical energy supplied from the APU of the aircraft 700 the fan drive of the unducted fan 704 via the controller, and/or based on the timing at which the controller provides such controlled electrical energy to the fan drive of the unducted fan 704.

In some examples, one or more control signal(s), control command(s), and/or control output(s) generated by the controller (e.g., to be transmitted to and/or received at the APU of the aircraft 700 and/or the fan drive of the unducted fan 704) is/are based on one or more end user (e.g., aircraft pilot) input(s) facilitated via a user interface of the control system of the aircraft 700. In such examples, one or more operation(s) of the controller, the fan drive, and/or the unducted fan 704 may occur in response to the end user input(s). In other examples, one or more control signal(s), control command(s), and/or control output(s) generated by the controller (e.g., to be transmitted to and/or received at the APU of the aircraft 700 and/or the fan drive of the unducted fan 704) is/are based on data detected by one or more sensor(s) of the control system of the aircraft 700. In such examples, one or more operation(s) of the controller, the fan drive, and/or the unducted fan 704 may occur automatically (e.g., without end user input and/or end user intervention) in response to the data detected by the sensor(s).

In some examples, the fan blades 716, the hub ring 718, and a rotor of the fan drive of the unducted fan 704 are freely rotatable when the fan drive is not actively powered (e.g., when the fan drive and/or, more generally, the ducted fan 104 is turned off). In such examples, non-powered rotation of the fan blades 716, the hub ring 718, and the rotor of the fan drive of the unducted fan 704 can occur in response to force applied by the fuselage boundary layer 720 and/or the surrounding free stream against the fan blades 716 of the unducted fan 704. In such examples, the non-powered rotation of the fan blades 716, the hub ring 718, and the rotor of the fan drive of the unducted fan 704 generates mechanical energy that can be converted to electrical energy and/or electrical power for the aircraft 700. Thus, the unducted fan 704 can advantageously operate as a windmill when the fan drive and/or, more generally, the unducted fan 704 is not actively powered (e.g., turned off).

FIG. 8 is a side cross-sectional view of the fuselage 702 of the aircraft 700 of FIG. 7 illustrating a first example configuration 800 of the unducted fan 704 of FIG. 7. In the illustrated example of FIG. 8, an example APU 802 of the aircraft 700 can be seen located within the fuselage 702. The APU 802 of the aircraft 700 is circumscribed by the outer skin 714 of the fuselage 702. The APU 802 is coupled to and/or supported within the fuselage 702 via example APU support struts 804.

In the illustrated example of FIG. 8, the unducted fan 704 includes a fan drive implemented and/or configured as an example electric ring motor 806. The electric ring motor 806 of FIG. 8 is operatively coupled (e.g., via one or more wire(s) and/or electrical conduit(s) to the APU 802 of the aircraft 700, and is further operatively coupled (e.g., via one or more direct or linked mechanical connection(s)) to the fan blades 716 of the unducted fan 704. The electric ring motor 806 of FIG. 8 is configured (e.g., sized, shaped, and/or structured) to rotate the fan blades 716 of the unducted fan 704 about the fuselage 702 and/or the APU 802 of the aircraft 700 in response to a supply of electrical energy provided to the electric ring motor 806 from the APU 802.

The electric ring motor 806 of FIG. 8 includes an example stator 808 and an example rotor 810, both of which circumscribe the APU 802 of the aircraft 700. The stator 808 is stationary. The rotor 810 is configured (e.g., sized, shaped, and/or structured) to move (e.g., rotate) relative to the stator 808. In the illustrated example of FIG. 8, the rotor 810 rotates relative to the stator 808 in response to electrical energy supplied to the stator 808 from the APU 802 of the aircraft 700. In some examples, the supply of electrical energy from the APU 802 to the stator 808 is controlled, managed, regulated, and/or adjusted via a controller of a control system of the aircraft 700, as further described below.

In the illustrated example of FIG. 8, the electric ring motor 806 is located within the fuselage 702 in an annular manner between the APU 802 and the outer skin 714 of the fuselage 702. For example, as shown in FIG. 8, the electric ring motor 806 is radially located between the APU 802 and the outer skin 714 of the fuselage 702, with the electric ring motor 806 circumscribing the APU 802, and with the outer skin 714 of the fuselage 702 circumscribing the electric ring motor 806. As further shown in FIG. 8, the rotor 810 of the electric ring motor 806 circumscribes the stator 808 of the electric ring motor 806. Example insulation 812 is located within the fuselage 702 in an annular manner between the APU 802 and the electric ring motor 806 to provide an insulative barrier between the APU 802 and the electric ring motor 806.

The rotor 810 of the electric ring motor 806 of FIG. 8 is operatively coupled (e.g., via one or more direct or linked mechanical connection(s)) to the fan blades 716 and/or the hub ring 718 of the unducted fan 704 such that the rotor 810, the fan blades 716, and the hub ring 718 rotate together as an integral unit. In this regard, the fan blades 716 and the hub ring 718 are respectively located radially outward relative to the rotor 810, with the fan blades 716 extending radially outward from the rotor 810 and/or from the hub ring 718. In the illustrated example of FIG. 8, the fan blades 816 and/or, more generally, the unducted fan 704 has/have a diameter that is less than or equal to four feet. In other examples, the fan blades 716 and/or, more generally, the unducted fan 704 can have a diameter that is greater than four feet.

FIG. 9 is a side cross-sectional view of the fuselage 702 of the aircraft 700 of FIG. 7 illustrating a second example configuration 900 of the unducted fan 704 of FIG. 7. In the illustrated example of FIG. 9, an example APU 902 of the aircraft 700 can be seen located within the fuselage 702. The APU 902 of the aircraft 700 is circumscribed by the outer skin 714 of the fuselage 702. The APU 902 is coupled to and/or supported within the fuselage 702 via example APU support struts 904. In some examples, the APU 902 of FIG. 9 can include an integrated secondary exhaust flow path structured in a manner similar to the integrated secondary flow path disclosed in U.S. Pat. No. 8,667,775.

In the illustrated example of FIG. 9, the unducted fan 704 includes a fan drive implemented and/or configured as an example electric motor 906 positioned in line with the APU 902. The electric motor 906 of FIG. 9 is operatively coupled (e.g., via one or more wire(s) and/or electrical conduit(s)) to the APU 902 of the aircraft 700, and is further operatively coupled (e.g., via one or more direct or linked mechanical connection(s)) to the fan blades 716 of the unducted fan 704. The electric motor 906 of FIG. 9 is configured (e.g., sized, shaped, and/or structured) to rotate the fan blades 716 of the unducted fan 704 about the fuselage 702 and/or the APU 902 of the aircraft 700 in response to a supply of electrical energy provided to the electric motor 906 from the APU 902.

The electric motor 906 of FIG. 9 includes an example stator 908 and an example rotor 910. The stator 908 is stationary. The rotor 910 is configured (e.g., sized, shaped, and/or structured) to move (e.g., rotate) relative to the stator 908. In the illustrated example of FIG. 9, the rotor 910 rotates relative to the stator 908 in response to electrical energy supplied to the stator 908 from the APU 902 of the aircraft 700. In some examples, the supply of electrical energy from the APU 902 to the stator 908 is controlled, managed, regulated, and/or adjusted via a controller of a control system of the aircraft 700, as further described below.

In the illustrated example of FIG. 9, the rotor 910 of the electric motor 906 is operatively coupled (e.g., via one or more direct or linked mechanical connection(s)) to the fan blades 716 and/or the hub ring 718 of the unducted fan 704 such that the rotor 910, the fan blades 716, and the hub ring 718 rotate together as an integral unit. In this regard, the fan blades 716 and the hub ring 718 are respectively located radially outward relative to the rotor 910, with the fan blades 716 extending radially outward from the rotor 910 and/or from the hub ring 718. In the illustrated example of FIG. 9, the fan blades 716 and/or, more generally, the unducted fan 704 has/have a diameter that is less than or equal to four feet. In other examples, the fan blades 716 and/or, more generally, the unducted fan 704 can have a diameter that is greater than four feet.

FIG. 10 is a side cross-sectional view of the fuselage 702 of the aircraft 700 of FIG. 7 illustrating a second example configuration 1000 of the unducted fan 704 of FIG. 7. In the illustrated example of FIG. 10, an example APU 1002 of the aircraft 700 can be seen located within the fuselage 702. The APU 1002 of the aircraft 700 is circumscribed by the outer skin 714 of the fuselage 702. The APU 1002 is coupled to and/or supported within the fuselage 702 via example APU support struts 1004. In some examples, the APU 1002 of FIG. 10 can include an integrated secondary exhaust flow path structured in a manner similar to the integrated secondary flow path disclosed in U.S. Pat. No. 8,667,775.

In the illustrated example of FIG. 10, the unducted fan 704 includes a fan drive implemented and/or configured as an example turboshaft 1006 positioned in line with the APU 1002. The turboshaft 1006 of FIG. 10 is operatively coupled (e.g., via one or more wire(s) and/or electrical conduit(s)) to the APU 1002 of the aircraft 700, and is further operatively coupled (e.g., via one or more direct or linked mechanical connection(s)) to the fan blades 716 of the unducted fan 704. The turboshaft 1006 of FIG. 10 is configured (e.g., sized, shaped, and/or structured) to rotate the fan blades 716 of the unducted fan 704 about the fuselage 702 and/or the APU 1002 of the aircraft 700 in response to a supply of electrical energy provided to the turboshaft 1006 from the APU 1002.

The turboshaft 1006 of FIG. 10 includes an example rotor 1008 that is configured (e.g., sized, shaped, and/or structured) to move (e.g., rotate) in response to electrical energy supplied to the turboshaft 1006 from the APU 1002 of the aircraft 700. In some examples, the supply of electrical energy from the APU 1002 to the turboshaft 1006 is controlled, managed, regulated, and/or adjusted via a controller of a control system of the aircraft 700, as further described below.

In the illustrated example of FIG. 10, the rotor 1008 of the turboshaft 1006 is operatively coupled (e.g., via one or more direct or linked mechanical connection(s)) to the fan blades 716 and/or the hub ring 718 of the unducted fan 704 such that the rotor 1008, the fan blades 716, and the hub ring 718 rotate together as an integral unit. In this regard, the fan blades 716 and the hub ring 718 are respectively located radially outward relative to the rotor 1008, with the fan blades 716 extending radially outward from the rotor 1008 and/or from the hub ring 718. In the illustrated example of FIG. 10, the fan blades 716 and/or, more generally, the unducted fan 704 has/have a diameter that is less than or equal to four feet. In other examples, the fan blades 716 and/or, more generally, the unducted fan 704 can have a diameter that is greater than four feet.

Figure 11:
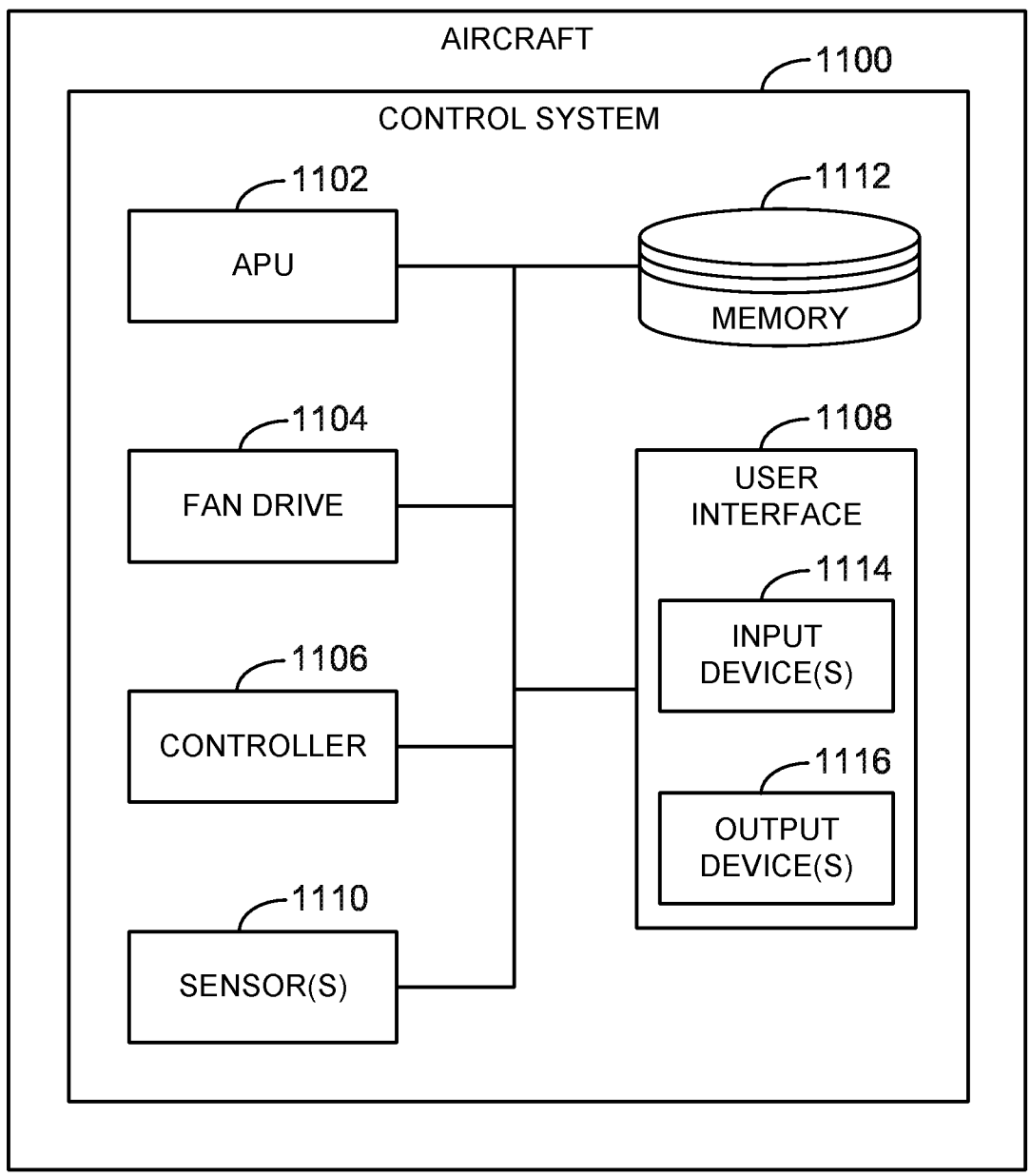
FIG. 11 is a block diagram of an example control system constructed in accordance with the teachings of this disclosure.

FIG. 11 is a block diagram of an example control system 1100 constructed in accordance with the teachings of this disclosure. The control system 1100 of FIG. 11 may be integrated and/or otherwise incorporated into an aircraft (e.g., the aircraft 100 of FIGS. 1-6, the aircraft 700 of FIGS. 7-10, etc.) to control, manage, regulate, and/or adjust one or more aspects(s) of the operation of a fan (e.g., the ducted fan 104 of FIGS. 1-6, the unducted fan 704 of FIG. 7-10, etc.) of the aircraft in connection with accelerating an aircraft fuselage boundary layer (e.g., the fuselage boundary layer 130 of FIGS. 1-6, the fuselage boundary layer 720 of FIGS. 7-10, etc.) traveling along an outer skin of a fuselage (e.g., the outer skin 114 of the fuselage 102 of FIGS. 1-6, the outer skin 714 of the fuselage 702 of FIGS. 7-10, etc.) of the aircraft.

In the illustrated example of FIG. 11, the control system 1100 includes an example APU 1102, an example fan drive 1104, an example controller 1106, an example user interface 1108, one or more example sensor(s) 1110, and an example memory 1112. In other examples, the user interface 1108, the sensor(s) 1110, and/or the memory 1112 can be omitted from the control system 1100. In still other examples, the control system 1100 can include one or more additional structure(s) and/or component(s) beyond those shown and described in connection with FIG. 11.

The connecting lines shown in FIG. 11 between various ones of the APU 1102, the fan drive 1104, the controller 1106, the user interface 1108, the sensor(s) 1110, and the memory 1112 represent operative couplings that include power connections as well as signal connections. For example, the connecting lines of FIG. 11 represent power connections that may include electrical wire for conducting electrical energy or power. The connecting lines of FIG. 11 further represent signal connections that may include electrical or optical wire and/or cable, or electrical or optical data buses, for transmitting and/or carrying signals such as sensor signals, command signals, control signals, etc.

The APU 1102 of the control system 1100 can be implemented, for example, via the APU 302 of FIG. 3, via the APU 402 of FIG. 4, via the APU 502 of FIG. 5, via the APU 602 of FIG. 6, via the APU 802 of FIG. 8, via the APU 902 of FIG. 9, or via the APU 1002 of FIG. 10. The APU 1102 of FIG. 11 generates electrical energy (e.g., via an electrical generator) to be supplied (e.g., as electric power) to one or more structure(s) and/or component(s) of the aircraft implementing the control system 1100. For example, the APU 1102 of FIG. 11 generates electrical energy to be supplied to the fan drive 1104 of FIG. 11. Electrical energy generated by the APU 1102 of FIG. 11 can additionally be supplied to the controller 1106, the user interface 1108, the sensor(s) 1110, and/or the memory 1112 of FIG. 11, and/or to other electrical structures and/or electrical components (e.g., an electrical power bus) of the aircraft implementing the control system 1100. In some examples, the control system 1100 of FIG. 11 can include one or more component(s) other than and/or in addition to the APU 1102 that is/are capable of supplying electrical energy to the fan drive 1104 of FIG. 11. For example, the control system 1100 of FIG. 11 can include one or more main engine(s) of the aircraft implementing the control system 1100, and such main engine(s) can supply electrical energy to the fan drive 1104 in addition or alternatively to the electrical energy supplied to the fan drive 1104 by the APU 1102.

The fan drive 1104 of the control system 1100 can be implemented, for example, via the electric ring motor 306 of FIG. 3, via the electric ring motor 406 of FIG. 4, via the electric motor 506 of FIG. 5, via the turboshaft 606 of FIG. 6, via the electric ring motor 806 of FIG. 8, via the electric motor 906 of FIG. 9, or via the turboshaft 1006 of FIG. 10. The fan drive 1104 of FIG. 11 includes a rotor (e.g., the rotor 310 of FIG. 3, the rotor 410 of FIG. 4, the rotor 510 of FIG. 5, the rotor 608 of FIG. 6, the rotor 810 of FIG. 8, the rotor 910 of FIG. 9, the rotor 1008 of FIG. 10, etc.) that rotates in response to a supply of electrical energy provided (e.g., as electric power) to the fan drive 1104 from the APU 1102 of FIG. 11.

The controller 1106 of the control system 1100 can be implemented by any type(s) and/or any number(s) of processor(s), microprocessor(s), controller(s), microcontroller(s), transmitter(s), receiver(s), circuit(s) and/or other electrical component(s). The controller 1106 of FIG. 11 controls, manages, regulates, and/or adjusts one or more aspect(s) of the operation of the APU 1102 and/or the fan drive 1104 of FIG. 11. In some examples, the controller 1106 of FIG. 11 controls, manages, regulates, and/or adjusts the amount of electrical energy supplied from the APU 1102 of FIG. 11 to the fan drive 1104 of FIG. 11. In other examples, the controller 1106 of FIG. 11 additionally or alternatively controls, manages, regulates, and/or adjusts a rotational speed of the fan drive 1104 of FIG. 11. In some examples, the controller 1106 of FIG. 11 causes the rotor of the fan drive 1104 of FIG. 11 to rotate at specific speeds (e.g., specific angular velocities) and/or specific times based on the extent and/or degree of the controlled electrical energy supplied from the APU 1102 to the fan drive 1104 via the controller 1106, and/or based on the timing at which the controller 1106 provides such controlled electrical energy to the fan drive 1104.

In some examples, one or more control signal(s), control command(s), and/or control output(s) generated by the controller 1106 (e.g., to be transmitted to and/or received at the APU 1102 and/or the fan drive 1104 of FIG. 11) is/are based on one or more end user (e.g., aircraft pilot) input(s) facilitated via the user interface 1108 of the control system 1100. In such examples, one or more operation(s) of the APU 1102, the fan drive 1104, and/or the controller 1106 may occur in response to the end user input(s). In other examples, one or more control signal(s), control command(s), and/or control output(s) generated by the controller 1106 (e.g., to be transmitted to and/or received at the APU 1102 and/or the fan drive 1104 of FIG. 11) is/are based on sensor data detected by the sensor(s) 1110 of the control system 1100. In such examples, one or more operation(s) of the APU 1102, the fan drive 1104, and/or the controller 1106 may occur automatically (e.g., without end user input and/or end user intervention) in response to the sensor data detected by the sensor(s) 1110.

The user interface 1108 of the control system 1100 facilitates interactions and/or communications between an end user (e.g., a pilot of the aircraft 100 of FIGS. 1-6 or the aircraft 700 of FIGS. 7-10) and the controller 1106, the memory 1112, and/or, more generally, the control system 1100. Data and/or information that is received from and/or presented by the user interface 1108 of FIG. 11 may be of any quantity, type, form and/or format, and may be stored in a computer-readable storage medium such as the memory 1112 of FIG. 11 described below.

The user interface 1108 of FIG. 11 includes one or more example input device(s) 1114 via which the user may input data, information, and/or commands to the controller 1106 and/or the memory 1112 of the control system 1100. For example, the input device(s) 1114 can include a control lever, a button, a knob, a switch, a touchscreen, an audio sensor, a microphone, and/or a camera that enable(s) the user to convey data, information, and/or commands to the controller 1106 and/or the memory 1112 of the control system 1100. In some examples, data, information, and/or commands input via the input device(s) 1114 of the user interface 1108 may indicate, correspond to, and/or constitute control data associated with a desired (e.g., target) operational state or parameter of the fan drive 1104 and/or a fan operated (e.g., rotated) via the fan drive 1104.

The user interface 1108 of FIG. 11 also includes one or more example output device(s) 1116 via which the user interface 1108 presents data and/or information in visual and/or audible form to the user. For example, the output device(s) 1116 may include a light emitting diode, a touchscreen, and/or a liquid crystal display for presenting visual data and/or information, and/or a speaker for presenting audible data and/or information. In some examples, data and/or information presented via the output device(s) 1116 of the user interface 1108 may indicate, correspond to, and/or constitute current (e.g., actual) sensor data detected, measured, and/or acquired via the sensor(s) 1110 of the control system 1100. In some such examples, the data and/or information presented via the output device(s) 1116 of the user interface 1108 may indicate, correspond to, and/or constitute a current (e.g., actual) operational state or parameter of the fan drive 1104 and/or a fan operated (e.g., rotated) via the fan drive 1104.

The sensor(s) 1110 of the control system 1100 can be implemented via one or more of an airspeed sensor, an altitude sensor, an angle of attack sensor, a control surface position sensor (e.g., a flap position sensor, a slat position sensor, etc.), a power supply sensor (e.g., a voltage sensor, a current sensor, etc.) associated with the APU 1102, and/or a rotational speed sensor associated with the fan drive 1104 and/or a fan operated (e.g., rotated) via the fan drive 1104. The sensor(s) 1110 sense, measure, and/or detect one or more operating state(s) and/or operating parameter(s) associated with the aircraft implementing the control system 1100. Sensor data senses, measured, detected, and/or acquired via the sensor(s) 1110 can include, for example, airspeed data, altitude data, angle of attack data, control surface position data, APU power supply data, fan drive rotational speed data, and/or fan rotational speed data. In some examples, the sensor(s) 1110 sense, measure, and/or detect one or more operating state(s) and/or operating parameter(s) associated with APU 1102, the fan drive 1104, and/or a fan operated (e.g., rotated) via the fan drive 1104 of the control system 1100 of FIG. 11. Data and/or information that is sensed, measured, detected, and/or acquired via the sensor(s) 1110 of FIG. 11 may be of any quantity, type, form and/or format, and may be stored in a computer-readable storage medium such as the memory 1112 of FIG. 11 described below.

The memory 1112 of the control system 1100 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 1112 of FIG. 11 may be stored in any file and/or data structure format, organization scheme, and/or arrangement. The memory 1112 of FIG. 11 is accessible to the controller 1106, the user interface 1108 (including the input device(s) 1114 and the output device(s) 1116), and/or the sensor(s) 1110 of FIG. 11, and/or, more generally, to the control system 1100 of FIG. 11.

In some examples, the memory 1112 of FIG. 11 stores control data accessed, processed, and/or generated by and/or at the controller 1106 of FIG. 11. In some examples, the memory 1112 of FIG. 11 stores control data associated with a desired (e.g., target) operational state or parameter of the fan drive 1104 and/or a fan operated (e.g., rotated) via the fan drive 1104, as received from the input device(s) 1114 of the user interface 1108 of FIG. 11. In some examples, the memory 1112 of FIG. 11 stores sensor data (e.g., airspeed data, altitude data, angle of attack data, control surface position data, APU power supply data, fan drive rotational speed data, fan rotational speed data, etc.) detected, measured, and/or acquired via the sensor(s) 1110 of FIG. 11. In some examples, the memory 1112 of FIG. 11 stores data and/or information presented via the output device(s) 1116 of the user interface 1108 including, for example, a current (e.g., actual) operational state or parameter of the fan drive 1104 and/or a fan operated (e.g., rotated) via the fan drive 1104.

While an example manner of implementing the control system 1100 is illustrated in FIG. 11, one or more of the elements, processes and/or devices illustrated in FIG. 11 may be combined, divided, re-arranged, omitted, eliminated, and/or implemented in any other way. Further, the APU 1102, the fan drive 1104, the controller 1106, the user interface 1108, the sensor(s) 1110, the memory 1112, and/or, more generally, the control system 1100 of FIG. 11 may be implemented by hardware, software, firmware and/or any combination of hardware, software and/or firmware. Thus, for example, any of the controller 1106, the user interface 1108, the sensor(s) 1110, the memory 1112, and/or, more generally, the control system 1100 of FIG. 11 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the controller 1106, the user interface 1108, the sensor(s) 1110, the memory 1112, and/or, more generally, the control system 1100 of FIG. 11 is/are hereby expressly defined to include a non-transitory computer-readable storage device or storage disk such as a memory, a digital versatile disk (DVD), a compact disk (CD), a Blu-ray disk, etc. including the software and/or firmware. Further still, the APU 1102, the fan drive 1104, the controller 1106, the user interface 1108, the sensor(s) 1110, the memory 1112, and/or, more generally, the control system 1100 of FIG. 11 may include one or more element(s), process(es) and/or device(s) in addition to, or instead of, those illustrated in FIG. 11, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 12:
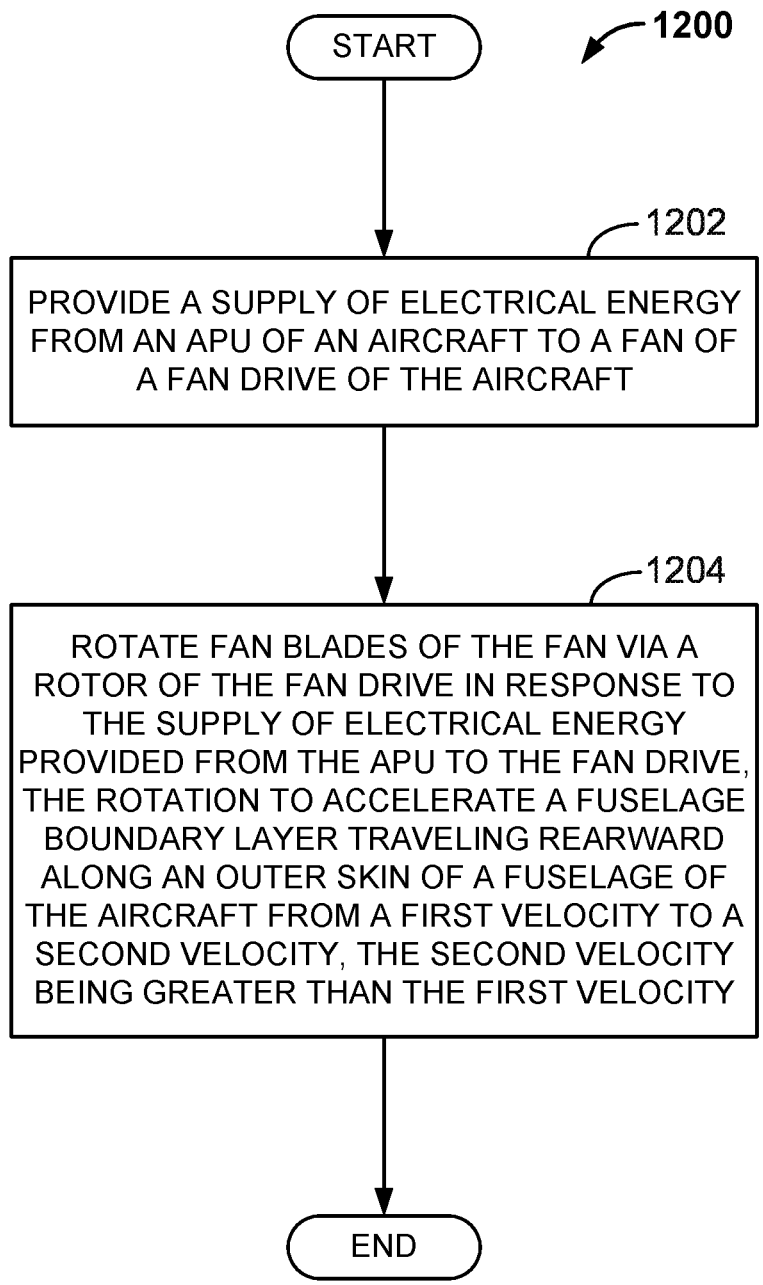
FIG. 12 is a flowchart representative of an example method for accelerating an aircraft fuselage boundary layer via a fan powered by an APU of the aircraft.

A flowchart representative of example hardware logic, machine-readable instructions, hardware implemented state machines, and/or any combination thereof for implementing the example control system 1100 of FIG. 11 is shown in FIG. 12. The machine-readable instructions may be one or more executable program(s) or portion(s) of executable program(s) for execution by a computer processor as may be implemented by the controller 1106 of the control system 1100. The program(s) may be embodied in software stored on a non-transitory computer-readable storage medium such as a CD-ROM, a floppy disk, a hard drive, a DVD, a Blu-ray disk, or a memory associated with the processor, but the entire program(s) and/or parts thereof could alternatively be executed by a device other than the processor and/or embodied in firmware or dedicated hardware. Further, although the example program(s) is/are described with reference to the flowchart illustrated in FIG. 12, many other methods of implementing the example control system 1100 of FIG. 11 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, a field-programmable gate array (FPGA), an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIG. 12 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 12 is a flowchart representative of an example method 1200 for accelerating an aircraft fuselage boundary layer via a fan powered by an APU of the aircraft. The method 1200 of FIG. 12 may be implemented in part by a control system of an aircraft such as the example control system 1100 of FIG. 11 described above. The method 1200 of FIG. 12 includes providing a supply of electrical energy from an APU (e.g., the APU 302 of FIG. 3, the APU 402 of FIG. 4, the APU 502 of FIG. 5, the APU 602 of FIG. 6, the APU 802 of FIG. 8, the APU 902 of FIG. 9, the APU 1002 of FIG. 10, the APU 1102 of FIG. 11, etc.) of an aircraft (e.g., the aircraft 100 of FIGS. 1-6, the aircraft 700 of FIGS. 7-10, etc.) to a fan drive (e.g., the electric ring motor 306 of FIG. 3, the electric ring motor 406 of FIG. 4, the electric motor 506 of FIG. 5, the turboshaft 606 of FIG. 6, the electric ring motor 806 of FIG. 8, the electric motor 906 of FIG. 9, the turboshaft 1006 of FIG. 10, the fan drive 1104 of FIG. 11, etc.) of a fan (e.g., the ducted fan 104 of FIGS. 1-6, the unducted fan 704 of FIGS. 7-10, etc.) of the aircraft (block 1202). In some examples, the supply of electrical energy provided at block 1202 of the method 1200 of FIG. 12 is controlled, managed, regulated, and/or adjusted via the controller 1106 of FIG. 11.

The method 1200 of FIG. 12 also includes rotating fan blades (e.g., the fan blades 116 of FIGS. 1-6, the fan blades 716 of FIGS. 7-10, etc.) of the fan via a rotor (e.g., the rotor 310 of FIG. 3, the rotor 410 of FIG. 4, the rotor 510 of FIG. 5, the rotor 608 of FIG. 6, the rotor 810 of FIG. 8, the rotor 910 of FIG. 9, the rotor 1008 of FIG. 10, etc.) of the fan drive in response to the supply of electrical energy provided to the fan drive (block 1204). In some examples, a rotational speed associated with the rotation of the rotor of the fan drive at block 1204 of the method 1200 of FIG. 12 is controlled, managed, regulated, and/or adjusted via the controller 1106 of FIG. 11. In some examples, the rotation of the rotor and/or the fan blades at block 1204 of the method 1200 of FIG. 12 accelerates a fuselage boundary layer (e.g., the fuselage boundary layer 130 of FIGS. 1-6, the fuselage boundary layer 720 of FIGS. 7-10, etc.) traveling rearward along an outer skin of a fuselage (e.g., the outer skin 114 of the fuselage 102 of FIGS. 1-6, the outer skin 714 of the fuselage 702 of FIGS. 7-10, etc.) of the aircraft from a first velocity to a second velocity greater than the first velocity. In some examples, the second velocity to which the fuselage boundary layer is accelerated does not exceed a free stream velocity at the fuselage. In some examples, the acceleration of the fuselage boundary layer does not generate thrust for the aircraft. Following block 1204, the method 1200 of FIG. 12 ends.

From the foregoing, it will be appreciated that methods and apparatus for accelerating an aircraft fuselage boundary layer via a fan powered by an APU of the aircraft are disclosed. Unlike known BLI solutions which require the installation of one or more large, heavy, thrust-producing engine(s) at the rear of the fuselage of the aircraft, the disclosed methods and apparatus ingest and accelerate an aircraft fuselage boundary layer via a fan that is operatively coupled to (e.g., in electrical communication with) the APU of the aircraft. The disclosed methods and apparatus advantageously implement a fan having a bulk (e.g., a size and/or a weight) that is substantially less than the bulk of the large, heavy, thrust-producing engine(s) required by known BLI solutions. In some examples, the fan implemented via the disclosed methods and apparatus has a diameter of no more than four feet.

The disclosed methods and apparatus advantageously leverage electrical energy produced by the APU of the aircraft as a source for powering the fan. In some examples, the energy required by the APU for powering the fan to produce a fuselage boundary layer drag-reduction benefit is less than the energy dissipated in the drag wake of the fuselage, thereby producing a positive tradeoff with regard to the overall fuel consumption and/or operating costs of the aircraft. In some such examples, the bulk (e.g., the size and/or the weight) of the fan is optimized such that the disclosed methods and apparatus reduce (e.g., substantially eliminate) the velocity deficit without producing a net velocity gain relative to the free stream velocity at the fuselage. The disclosed methods and apparatus accordingly implement a fan which is not a thrust-producing engine, and/or which does not generate thrust for the aircraft. In some examples, the disclosed methods and apparatus for ingesting and accelerating an aircraft fuselage boundary layer utilize structural components that are retrofittable with, and/or easily incorporated into, one or more existing aircraft design(s). In such examples, the disclosed methods and apparatus can advantageously be implemented on an existing aircraft and/or incorporated into an existing aircraft design without making significant structural modifications to the aircraft.

The following paragraphs provide various examples of the examples disclosed herein.

Example 1 includes an aircraft. The aircraft of Example 1 comprises a fuselage, an APU, and a fan. The fuselage includes an outer skin. The APU is located within the fuselage. The fan includes a plurality of fan blades arranged circumferentially about the APU and projecting radially outward from the outer skin. The fan further includes a fan drive operatively coupled to the APU. The fan drive is configured to rotate the fan blades in response to a supply of electrical energy provided to the fan drive from the APU. The rotation of the fan blades is to accelerate a fuselage boundary layer traveling rearward along the outer skin from a first velocity to a second velocity greater than the first velocity.

Example 2 includes the aircraft of Example 1, wherein the second velocity to which the fuselage boundary layer is accelerated does not exceed a free stream velocity at the fuselage.

Example 3 includes the aircraft of any of Examples 1-2, wherein the acceleration of the fuselage boundary layer does not generate thrust for the aircraft.

Example 4 includes the aircraft of any of Examples 1-3, wherein the fan is located along a rear section of the fuselage at a position rearward of a stabilizer of a tail of the aircraft.

Example 5 includes the aircraft of any of Examples 1-4, wherein the fan has a diameter defined by a radial extent of the fan blades, the diameter being less than or equal to four feet.

Example 6 includes the aircraft of any of Examples 1-5, wherein the fan includes a hub ring operatively coupled to a rotor of the fan drive and substantially aligned with the outer skin of the fuselage. The hub ring is configured to rotate about the APU in response to rotation of the rotor. The fan blades are coupled to and extend radially outward from the hub ring.

Example 7 includes the aircraft of any of Examples 1-6, wherein the fan includes a duct circumscribing the fan blades.

Example 8 includes the aircraft of any of Examples 1-6, wherein the fan does not include a duct circumscribing the fan blades.

Example 9 includes the aircraft of any of Examples 1-6, wherein the fan drive is an electric ring motor having a stator and a rotor. The rotor is rotatable relative to the stator. The fan blades are operatively coupled to and extend radially outward from the rotor. The electric ring motor circumscribes the APU. The outer skin of the fuselage circumscribes the electric ring motor.

Example 10 includes the aircraft of any of Examples 1-6, wherein the fan includes a duct circumscribing the fan blades, the duct having an inner surface and an outer surface located radially outward of the inner surface. The fan drive is an electric ring motor having a stator and a rotor. The rotor is rotatable relative to the stator. The fan blades are operatively coupled to and extend radially inward from the rotor. The rotor is located within the duct between the inner surface and the outer surface.

Example 11 includes the aircraft of any of Examples 1-6, wherein the fan drive is an electric motor positioned within the fuselage in line with the APU. The electric motor has a stator and a rotor. The rotor is rotatable relative to the stator. The fan blades are operatively coupled to and extend radially outward from the rotor.

Example 12 includes the aircraft of any of Examples 1-6, wherein the fan drive is a turboshaft positioned within the fuselage in line with the APU. The turboshaft has a rotor. The fan blades are operatively coupled to and extend radially outward from the rotor.

Example 13 includes the aircraft of any of Examples 1-12, wherein the aircraft further comprises a controller configured to control the supply of electrical energy from the APU to the fan drive.

Example 14 includes the aircraft of any of Examples 1-12, wherein the aircraft further comprises a controller configured to control a rotational speed of the fan drive.

Example 15 includes a method. The method of Example 15 comprises providing a supply of electrical energy from an APU of an aircraft to a fan drive of a fan of the aircraft. The fan drive is operatively coupled to the APU. The fan includes a plurality of fan blades arranged circumferentially about the APU and projecting radially outward from an outer skin of a fuselage of the aircraft. The APU is located within the fuselage. The method of Example 18 further comprises rotating the fan blades via the fan drive in response to the supply of electrical energy provided to the fan drive. The rotation of the fan blades accelerates a fuselage boundary layer traveling rearward along the outer skin from a first velocity to a second velocity greater than the first velocity.

Example 16 includes the method of Example 15, wherein the second velocity to which the fuselage boundary layer is accelerated does not exceed a free stream velocity at the fuselage.

Example 17 includes the method of any of Examples 15-16, wherein the acceleration of the fuselage boundary layer does not generate thrust for the aircraft.

Example 18 includes the method of any of Examples 15-17, wherein the fan has a diameter defined by a radial extent of the fan blades, the diameter being less than or equal to four feet.

Example 19 includes the method of any of Examples 15-18, wherein the method further comprises controlling the supply of electrical energy from the APU to the fan drive via a controller of the aircraft.

Example 20 includes the method of any of Examples 15-18, wherein the method further comprises controlling a rotational speed of the fan drive via a controller of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft, comprising:
   a fuselage having an outer skin;
   an auxiliary power unit (APU) located within the fuselage; and
   a fan including:
      a plurality of fan blades arranged circumferentially about the APU and projecting along a direction that extends radially outward from the outer skin;
      a fan drive operatively coupled to the APU, the fan drive configured to rotate the fan blades to by receiving a supply of electrical energy from the APU, the rotation of the fan blades to accelerate a fuselage boundary layer traveling rearward along the outer skin from a first velocity to a second velocity greater than the first velocity, and
      a duct circumscribing the fan blades, the duct having an inner surface and an outer surface located radially outward of the inner surface, wherein the fan drive is an electric ring motor having a stator and a rotor, the rotor being rotatable relative to the stator, the fan blades being operatively coupled to and extending radially inward from the rotor, the rotor being located within the duct between the inner surface and the outer surface.

2. The aircraft of claim 1, wherein the acceleration of the fuselage boundary layer does not generate thrust for the aircraft.

3. The aircraft of claim 1, wherein the fan is located along a rear section of the fuselage at a position rearward of a stabilizer of a tail of the aircraft.

4. The aircraft of claim 1, wherein the fan has a diameter defined by a radial extent of the fan blades, the diameter being less than or equal to four feet.

5. The aircraft of claim 1, wherein the fan includes a hub ring operatively coupled to the rotor of the fan drive and substantially aligned with the outer skin of the fuselage, the hub ring configured to rotate about the APU in response to rotation of the rotor, the fan blades being coupled to and extending radially outward from the hub ring.

6. The aircraft of claim 1, wherein the electric ring motor circumscribes the APU, and the outer skin of the fuselage circumscribes the electric ring motor.

7. The aircraft of claim 1, wherein the electric ring motor is positioned within the fuselage and inline with the APU.

8. The aircraft of claim 1, further comprising a turboshaft positioned within the fuselage and inline with the APU.

9. The aircraft of claim 1, further comprising a controller configured to control the supply of electrical energy from the APU to the fan drive.

10. The aircraft of claim 1, further comprising a controller configured to control a rotational speed of the fan drive.

11. A method, comprising:
    providing a supply of electrical energy from an auxiliary power unit (APU) of an aircraft to a fan drive of a fan of the aircraft, the fan drive being operatively coupled to the APU, the fan including a plurality of fan blades arranged circumferentially about the APU and projecting along a direction that extends radially outward from an outer skin of a fuselage of the aircraft, the APU being located within the fuselage; and
    rotating the fan blades via the fan drive in response to the supply of electrical energy provided to the fan drive, the rotation of the fan blades accelerating a fuselage boundary layer traveling rearward along the outer skin from a first velocity to a second velocity greater than the first velocity, wherein the fan includes a duct circumscribing the fan blades, the duct having an inner surface and an outer surface located radially outward of the inner surface, and wherein the fan drive is an electric ring motor having a stator and a rotor, the rotor being rotatable relative to the stator, the fan blades being operatively coupled to and extending radially inward from the rotor, the rotor being located within the duct between the inner surface and the outer surface.

12. The method of claim 11, wherein the second velocity to which the fuselage boundary layer is accelerated does not exceed a free stream velocity at the fuselage.

13. The method of claim 11, wherein the acceleration of the fuselage boundary layer does not generate thrust for the aircraft.

14. The method of claim 11, wherein the fan has a diameter defined by a radial extent of the fan blades, the diameter being less than or equal to four feet.

15. The method of claim 11, further comprising controlling the supply of electrical energy from the APU to the fan drive via a controller of the aircraft.

16. The method of claim 11, further comprising controlling a rotational speed of the fan drive via a controller of the aircraft.

17. The aircraft of claim 1, wherein the duct converges toward a rear of the fuselage.

18. The aircraft of claim 1, wherein the duct is coupled to the fuselage via struts that extend from the outer skin.

19. The aircraft of claim 5, wherein the hub ring converges toward a rear of the fuselage.

20. The aircraft of claim 5, wherein the hub ring is a first hub ring, and further including a second hub ring circumscribing the first hub ring.

* * * * *